(12) United States Patent
Wu

(10) Patent No.: US 10,976,492 B2
(45) Date of Patent: Apr. 13, 2021

(54) CABLE WITH OVERCOATED NON-COPLANAR GROUPS OF FUSION SPLICED OPTICAL FIBERS, AND FABRICATION METHOD

(71) Applicant: CORNING INCORPORATED, Corning, NY (US)

(72) Inventor: Qi Wu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/551,883

(22) Filed: Aug. 27, 2019

(65) Prior Publication Data

US 2020/0081186 A1    Mar. 12, 2020

Related U.S. Application Data

(60) Provisional application No. 62/728,326, filed on Sep. 7, 2018.

(51) Int. Cl.
*G02B 6/255* (2006.01)
*G02B 6/44* (2006.01)

(52) U.S. Cl.
CPC ............ *G02B 6/255* (2013.01); *G02B 6/443* (2013.01)

(58) Field of Classification Search
CPC ................................ G02B 6/255; G02B 6/443
See application file for complete search history.

(56) References Cited

U.S. PATENT DOCUMENTS 3,740,479 A   6/1973   Green et al.
4,077,702 A   3/1978   Kunze et al.
(Continued)

FOREIGN PATENT DOCUMENTS

CN   1548492 A   11/2004
CN   202494801 U   10/2012
(Continued)

OTHER PUBLICATIONS

International Search Report and Written Opinion of the International Searching Authority; PCT/US2019/048510; dated Nov. 11, 2019; 17 Pages; European Patent Office.
(Continued)

*Primary Examiner* — Daniel Petkovsek
(74) *Attorney, Agent, or Firm* — Kapil U. Banakar

(57) ABSTRACT

A fiber optic cable includes a plurality of fusion spliced optical fibers, with a polymeric overcoating extending over a fusion splice region as well as over a stripped section of each optical fiber proximate to the fusion splice region, wherein the plurality of fusion spliced optical fibers has a non-coplanar arrangement at the fusion splice region. A method for fabricating a fiber optic cable includes fusion splicing first and second pluralities of optical fibers arranged in a respective one-dimensional array to form a plurality of fusion spliced optical fibers, and contacting the fusion splices as well as stripped sections of the fusion spliced optical fibers with polymeric material in a flowable state. Either before or after the contacting step, the method further includes altering a position of at least some of the spliced optical fibers to yield a configuration in which the plurality of fusion spliced optical fibers have a non-coplanar arrangement at the fusion splice region. The method further includes solidifying the polymeric material.

23 Claims, 11 Drawing Sheets

(56) References Cited

U.S. PATENT DOCUMENTS

| | | | |
|---|---|---|---|
| 4,254,865 A | | 3/1981 | Pacey et al. |
| 4,509,820 A | | 4/1985 | Murata et al. |
| 4,537,468 A | * | 8/1985 | Degoix ................ G02B 6/2558 385/96 |
| 4,714,316 A | | 12/1987 | Moore et al. |
| 4,778,242 A | | 10/1988 | Ota et al. |
| 4,812,010 A | | 3/1989 | Osaka et al. |
| 4,865,411 A | | 9/1989 | Darsey et al. |
| 4,923,274 A | | 5/1990 | Dean |
| 5,022,735 A | | 6/1991 | Dahlgren |
| 5,212,756 A | * | 5/1993 | Eoll ...................... G02B 6/4403 385/109 |
| 5,231,688 A | | 7/1993 | Zimmer |
| 5,247,598 A | | 9/1993 | Takimoto et al. |
| 5,367,591 A | | 11/1994 | Seike et al. |
| 5,416,873 A | | 5/1995 | Huebscher et al. |
| 5,731,051 A | | 3/1998 | Fahey et al. |
| 5,832,162 A | * | 11/1998 | Sarbell ................. G02B 6/2558 385/99 |
| 6,099,170 A | * | 8/2000 | Sarbell ................. G02B 6/2558 385/95 |
| 6,152,611 A | | 11/2000 | Mardirossian |
| 6,295,400 B1 | | 9/2001 | Shahid |
| 6,367,990 B1 | | 4/2002 | Dumitriu |
| 6,421,493 B1 | | 7/2002 | Burek et al. |
| 6,454,471 B1 | | 9/2002 | Ware et al. |
| 6,485,199 B1 | | 11/2002 | Ware et al. |
| 6,614,971 B2 | | 9/2003 | Sun et al. |
| 6,676,299 B1 | | 1/2004 | Durrant et al. |
| 6,738,555 B1 | | 5/2004 | Cooke et al. |
| 6,771,961 B2 | | 8/2004 | Bamburak et al. |
| 7,461,981 B2 | | 12/2008 | Yow, Jr. et al. |
| 8,047,726 B2 | | 11/2011 | Tamekuni et al. |
| 8,408,811 B2 | | 4/2013 | de Jong et al. |
| 8,408,818 B2 | | 4/2013 | Homma |
| 8,573,855 B2 | | 11/2013 | Nhep |
| 8,696,221 B2 | | 4/2014 | Vastmans et al. |
| 8,824,841 B1 | | 9/2014 | Mullen |
| 8,915,659 B2 | | 12/2014 | Marcouiller et al. |
| 9,089,931 B1 | | 7/2015 | Carberry et al. |
| 9,167,626 B1 | | 10/2015 | Wu |
| 9,360,624 B2 | | 6/2016 | Faulkner et al. |
| 9,604,261 B2 | | 3/2017 | Wu |
| 9,939,599 B2 | | 4/2018 | Blazer et al. |
| 10,018,782 B2 | | 7/2018 | Wu |
| 10,209,447 B2 | * | 2/2019 | Filipowicz ........... G02B 6/2558 |
| 10,353,154 B2 | | 7/2019 | Ott et al. |
| 2003/0103743 A1 | | 6/2003 | Sun et al. |
| 2004/0062480 A1 | | 4/2004 | Cronk et al. |
| 2005/0271338 A1 | | 12/2005 | Livingston |
| 2006/0093281 A1 | | 5/2006 | Kesler |
| 2012/0243838 A1 | | 9/2012 | Sato et al. |
| 2012/0281951 A1 | | 11/2012 | Takahashi et al. |
| 2014/0321813 A1 | | 10/2014 | Lu |
| 2016/0349453 A1 | | 12/2016 | Wu |
| 2017/0001224 A1 | | 1/2017 | Wu |
| 2017/0031121 A1 | | 2/2017 | blazer et al. |
| 2018/0011262 A1 | | 1/2018 | Chabot et al. |
| 2018/0024294 A1 | | 1/2018 | Wang et al. |

FOREIGN PATENT DOCUMENTS

| | | |
|---|---|---|
| DE | 202007013173 U1 | 1/2008 |
| EP | 0057828 A1 | 1/1982 |
| EP | 1168018 A2 | 1/2002 |
| JP | 55103513 A | 8/1980 |
| JP | 55129305 A | 10/1980 |
| JP | 58147707 A | 9/1983 |
| JP | 59037515 A | 3/1984 |
| JP | 62015504 A | 1/1987 |
| JP | 11326677 A | 11/1999 |
| JP | 2001147340 A | 5/2001 |
| JP | 2004347801 A | 12/2004 |
| JP | 2005250294 A | 9/2005 |
| JP | 2009163165 A | 7/2009 |
| JP | 2011232375 A | 11/2011 |
| JP | 05233859 B2 | 7/2013 |
| WO | 2009040271 A2 | 4/2009 |
| WO | 2011112764 A1 | 9/2011 |
| WO | 2013007969 A2 | 1/2013 |
| WO | 2018175122 A1 | 9/2018 |

OTHER PUBLICATIONS

Duke et al; "Benefits of CO2 Laser Heating for High Reliability Fiber Splicing," Proc. SPIE 9735, pp. B1-B12, 2016.
Friebele et al; "Method for Recoating Optical Fibres With Polyimide," Electron. Lett, 34, pp. 1249-1250, 1998.
Glaesemann et al; "The Mechanical Reliability of Corning Optical Fiber in Small Bend Scenarios"; Corning; ISO 9001 Registered; (2007) 8 Pages.
Matsumoto et al; "Design and Characteristics of Reinforcement Method for Fusion Spliced Optical Fiber," J. Lightwave Technol., LT-3, pp. 322-327, 1985.
Serafini.; "Compact and Reliable Protection of Single-Fiber and Ribbon-Fiber Fusion Splices" Proc. SPIE 1973, pp. 306-315 1993.
Trunk et al; "Protection With Heat-Shrinkable Sleeves for Optical Fiber Arc Fusion Splicing," Proc. SPIE 1365, Components for Fiber Optic Applications V, pp. 124-130, 1990.
Volotinen et al; "Effect of Mechanical Stripping and Arc-Fusion on the Strength and Aging of a Spliced Recoated Optical Fiber," Mat. Res. Soc. Symp. Proc. 531, pp. 163-168, 1998.
Woo, "Reliability of Optical Connectors and Splices," Proc. SPIE 2074, pp. 276-287, 1994.
Wu; "Fiber Optic Cable Assembly With Thermoplastically Overcoated Fusion Splice" Filed as U.S. Appl. No. 62/592,564, filed Nov. 30, 2017; 78 Pages.
Wu; "Method and Apparatus for Protecting Fusion Spliced Optical Fibers With Thermoplastic Material" Filed as U.S. Appl. No. 62/592,578, filed Nov. 30, 2017; 81 Pages.
Yablon, A.D.; "Optical Fiber Fusion Splicing," Springer, 2005; pp. 161-180.
Yamada et al; "Arc Usion Splicer With Profile Alignment System for High-Strength Low-Loss Optical Submarine Cable," J. Lightwave Technol., LT-4, pp. 1204-1210, 1986.

* cited by examiner

CABLE WITH OVERCOATED NON-COPLANAR GROUPS OF FUSION SPLICED OPTICAL FIBERS, AND FABRICATION METHOD

PRIORITY APPLICATION

This application claims the benefit of priority of U.S. Provisional Application No. 62/728,326, filed on Sep. 7, 2018, the content of which is relied upon and incorporated herein by reference in its entirety.

BACKGROUND

The disclosure relates generally to fiber optic cables incorporating multiple groups of protected fusion splices, in addition to methods for fabricating such cables.

Optical fibers are useful in a wide variety of applications, including the telecommunications industry for voice, video, and data transmission. In a telecommunications system that uses optical fibers, there are typically many locations where fiber optic cables, which carry the optical fibers, connect to equipment or other fiber optic cables. Fiber optic cables are frequently produced by extruding thermoplastic material (e.g., polyvinylchloride (PVC)) over at least one coated optical fiber.

FIG. 1 is a cross-sectional view of an exemplary coated optical fiber 10 that includes a glass core 12, glass cladding 14 surrounding the glass core 12, and a multi-layer polymer coating 20 (including an inner primary coating layer 16 and an outer secondary coating layer 18) surrounding the glass cladding 14. The inner primary coating layer 16 may be configured to act as a shock absorber to minimize attenuation caused by any micro-bending of the coated optical fiber 10. The outer secondary coating layer 18 may be configured to protect the inner primary coating layer 16 against mechanical damage, and to act as a barrier to lateral forces. The outer diameter of the coated optical fiber 10 may be about 200 μm, about 250 μm, or any other suitable value. Optionally, an ink layer (e.g., having a thickness of about 5 μm) may be arranged over the outer secondary coating layer 18 of the coated optical fiber 10 to color the fiber (e.g., as is commonly used in ribbonized fibers), or a coloring agent may be mixed with the coating material that forms the outer secondary coating layer 18. An additional buffer coating ("buffer"; not shown), may be applied to the coated optical fiber 10 to provide additional protection and allow for easier handling, effectively forming a cable. The buffer may be embodied in a layer of different material applied to the coating 20, thereby forming a "tight buffer" closely surrounding (intimately contacting and conforming to) the coating 20. Alternatively, the buffer may be embodied in a pre-formed tube (also known as a furcation tube or buffer tube) that has an inner diameter larger than the coating 20 and into which the coated optical fiber 10 is inserted, thereby forming a "loose buffer." This additional buffer typically has an outer diameter of about 900 μm.

In this disclosure, the term "optical fiber" (or "fiber") will be used in a generic sense and may encompass bare optical fibers, coated optical fibers, or buffered optical fibers, as well as optical fibers including different sections corresponding to these fiber types, unless it is clear from the context which of the types is intended. "Bare optical fibers" (including "bare glass optical fibers") or "bare sections" are those with no coating present on the fiber cladding. "Coated optical fibers" or "coated sections" include a single or multi-layer coating (typically an acrylic material) surrounding the fiber cladding and have a nominal (i.e., stated) diameter no greater than twice the nominal diameter of the bare optical fiber. "Buffered optical fibers" or "buffered sections" are coated optical fibers with an additional buffer that increases the nominal diameter of the optical fiber to more than twice the nominal diameter of the bare optical fiber, with 900 μm being the most typical nominal diameter. Buffered optical fibers may also be referred to as "buffered cables." Finally, the term "unbuffered optical fibers" refers to optical fibers without a buffer, and therefore may encompass either bare optical fibers or coated optical fibers.

Optical fiber fusion splicing, which is the process by which a permanent, low-loss, high-strength, fused (or welded) joint is formed between two optical fibers, typically involves multiple tasks. First, polymer coatings (e.g., coating layers 16, 18 of FIG. 1) of coated optical fibers (e.g., coated optical fiber 10 of FIG. 1) are stripped to expose glass cladding (e.g., glass cladding 14 of FIG. 1). Next, flat fiber end faces are formed, typically by cleaving exposed glass portions of the fibers. Then the fibers are laterally aligned to each other. The fiber tips must be heated to their softening point and pressed together to form a joint. Checks such as loss estimation and proof testing (to ensure long term mechanical reliability) may be performed. The completed fusion splice must also protected from the environment using packaging, which serves to shield fiber surfaces from mechanical degradation (e.g., abrasion) and chemical degradation (e.g., humidity) to ensure that splices exhibit long-term reliability. Optical fibers must typically be able to withstand service temperatures spanning at least a range of from −40° C. to 85° C. without suffering significant mechanical and/or optical performance degradation.

Heat shrink protection sleeves are commonly used as packaging to protect spliced optical fibers. Such a sleeve typically includes an outer heat shrink tube (typically made of a heat shrinkable material (e.g., a polyolefin) and/or a non-stick material (e.g., polytetrafluoroethylene (PTFE)), an inner thermoplastic tube typically made of a melt flow adhesive material (e.g., ethylene vinyl acetate (EVA)), and a stainless steel rod serving as the strength member or splint. When heated in an oven (e.g., associated with a fusion splicing tool), the thermoplastic tube melts and is compressed around the fiber and the stainless steel rod by the heat shrink tube, forming a hermetic seal around the fusion splice region.

FIG. 2 illustrates a first exemplary heat shrink protection sleeve 28 that includes an outer heat shrink tube 26, an integrated (e.g., stainless) steel strength member 24 (e.g., a stainless steel rod or splint) integrated with and contained in the outer heat shrink tube 26, and an inner thermoplastic tube 22 within which the coated optical fiber 10 of FIG. 1 is arranged. The inner primary coating layer 16 and outer secondary coating layer 18 of the multi-layer polymer coating 20 are not illustrated in FIG. 2 to simplify the drawing. The outer heat shrink tube 26 and the inner thermoplastic tube 22 are shown in FIG. 2 in an "unshrunken" state (prior to application of heat thereto), with the inner thermoplastic tube 22 being loosely fitted around the optical fiber 10, and with the outer heat shrink tube 26 being loosely fitted around the integrated strength member 24 and the inner thermoplastic tube 22. It is to be appreciated that following application of sufficient heat, the inner thermoplastic tube 22 will soften and/or melt to more closely conform to the exterior of the optical fiber 10, and the outer heat shrink tube 26 will contract around the stainless steel strength member 24 and the inner thermoplastic tube 22. The purpose of the integrated strength member 24 is to resist bending and enhance tensile strength, thereby enhancing reliability of a splice—particularly when an optical fiber containing the splice needs to be coiled in a tight space.

Another exemplary heat shrink protection sleeve 30 used to protect a splice joint 32 formed between two coated optical fibers 10A, 10B is schematically illustrated in FIGS. 3A and 3B. The heat shrink protection sleeve 30 includes a generally cylindrical inner tube 34 (e.g., a melt flow adhesive material such as ethylene vinyl acetate (EVA)) and a generally cylindrical outer tube 36 (e.g., a polyolefin and/or PTFE), wherein the outer tube 36 generally surrounds the inner tube 34, and the inner tube 34 defines an interior passage 40. The outer tube 36 is required for conventional heat shrink protection sleeves because the melt flow adhesive material (e.g., EVA) has a very high viscosity and a very low softening temperature (e.g., about 100° C.). The more temperature-resistant outer tube 36 is typically considered indispensable, particularly when the splice is intended for operation over a high temperature range of up to about 85° C. In use, the heat shrink protection sleeve 30 is positioned over a fusion spliced section of two optical fibers 10A, 10B. The fusion spliced section includes a splice joint 32 arranged between (stripped) glass cladding segments 14A, 14B of the respective optical fibers 10A, 10B. Upon application of heat (typically within an oven), the inner tube 34 melts around the optical fibers 10A, 10B, the glass cladding segments 14A, 14B, and the splice joint 32. The outer tube 36, which includes a cylindrical outer surface 38, may include some heat shrinking capability to help the adhesive distribute around the fused optical fibers 10A, 10B.

As the de facto splice protection technology in the fiber optics industry for decades, limitations of heat shrink protection sleeves are well known. Firstly, an operator must remember to thread (i.e., guide) an optical fiber through the heat shrink protection sleeve before fusion splicing is performed. A misstep in this process may require breaking and reworking the splice. Secondly, an optical fiber is subject to being threaded in the wrong place when the splice protector is small in diameter. If the optical fiber is in a cavity inside the outer tube but outside the inner tube (e.g., such as the inner and outer tubes 22, 26 of FIG. 2), the optical fiber will be in direct contact with the stainless steel strength member, which can weaken or break the fiber. Thirdly, curing the heat shrink protection sleeve can take at least 30 seconds, with such duration representing the longest and rate-limiting fraction of the time necessary to complete a single fusion splicing cycle. Additionally, fusion splices protected with heat shrink protection sleeves are bulky and inflexible, necessitating the use of a splice tray, module, or the like to manage the protection sleeves. This increases the cost and limits the size (i.e., miniaturization) of fiber optic components that contain fusion splices. Lastly, in cable assembly applications, a heat shrink protection sleeve requires excess jacket strip length, which requires an extra process step and extra material to protect the exposed cable after splicing.

Groups of coated optical fibers (e.g. 4, 8, 12, or 24 optical fibers) may be held together using a matrix material, intermittent inter-fiber binders ("spiderwebs"), or tape to form "optical fiber ribbons" or "ribbonized optical fibers" to facilitate packaging within cables. For example, optical fiber ribbons are widely used in cables for high capacity transmission systems. Some modern cables in large-scale data centers or fiber-to-the-home networks may contain up to 3,456 optical fibers, and cables having even higher optical fiber counts are under development. Optical fibers that form a ribbon are arranged in parallel in a linear (i.e., one-dimensional) array, with each fiber having a different color for ease of identification. FIG. 4 provides a cross-sectional view of a multi-fiber ribbon 42, which includes twelve optical fibers 44A-44L and a matrix 46 encapsulating the optical fibers 44A-44L. The optical fibers 44A-44L are substantially aligned with one another in a generally parallel configuration, preferably with an angular deviation of no more than one degree from true parallel at any position. Although twelve optical fibers 44A-44L are shown in the ribbon 42, it is to be appreciated that any suitable number of multiple fibers (but preferably at least four fibers) may be employed to form optical fiber ribbons suitable for a particular use.

Mass fusion splicing is a high throughput technology for interconnecting large number of fibers in a ribbon format. First and second segments of up to twelve fibers arranged in a linear array can be fusion spliced simultaneously by mass fusion splicing. Since sequential formation of twelve fusion splices using a traditional single fiber fusion splicing technique is very time consuming, the ability to fusion splice linearly arrayed segments of up to twelve fibers simultaneously enables entire ribbons to be spliced rapidly, thereby improving manufacturing throughput. Mass fusion splicing also allows for potential material savings. It enables migration from common indoor distribution cables with 900 μm fibers to smaller mini-distribution cables with 250 μm or 200 μm fibers, which is more cost-effective.

Heat shrink protection sleeves similar to those outlined above have also been applied to protect optical fiber ribbon splices, which include multiple fusion splices between first and second arrays of parallel optical fibers contained in first and second optical fiber ribbon segments, respectively. In such a context, an integrated strength member typically includes a flat surface to support the fusion spliced fiber arrays, a thermoplastic inner tube is melted around the spliced ribbon cables and the integrated strength member, and a more temperature-resistant outer tube encases the thermoplastic inner tube. The cross section of a typical ribbon splice protector is 4 mm×4.5 mm, and the length is about 40 mm. Such a splice protector is suitable for interfacing with optical fiber ribbons, but not jacketed cables since the cross-sectional width of a ribbon-type splice protector is much larger than that of a jacketed cable.

For end uses requiring smaller cable widths, loose tube cables having a round cross section with an outer diameter of 2 mm or 3 mm are commonly employed. Alternatively, a round cable may include a rollable optical fiber ribbon, such as disclosed in U.S. Patent Application Publication No. 2017/0031121 A1 (with the content of such publication being incorporated by reference herein). As noted in such publication, a rollable optical fiber ribbon includes a ribbon body formed over flexible polymeric material such that a plurality of optical fibers are reversibly movable between a position in which the optical fibers are arranged in a one-dimensional array and a position in which the optical fibers are arranged in a curved shape from a cross-sectional view.

Unfortunately, current mass fusion splice technology, as well as current fusion splice protection technology, only support one-dimensional arrays of optical fiber splices. For splicing of fibers of small diameter round cables, it is necessary to ribbonize loose tube fibers or arrange rollable optical fiber ribbons in a one-dimensional array to permit mass fusion splicing, and the mass fusion spliced one-dimensional array of fibers is typically protected in a bulky heat shrink sleeve. FIG. 5 illustrates a conventional cable assembly 50 incorporating first and second loose tube-type cables 52A, 52B bearing pre-coated loose optical fibers 54A, 54B, with stripped sections thereof that are mass fusion spliced in a one-dimensional array in a fusion splice region 56 that is protected by a conventional ribbon splice protector 60. The ribbon splice protector 60 includes an outer heat shrink member 64 and an inner thermoplastic member 62 that surrounds the fusion splice region 56 as well as stripped sections (not shown) of the loose optical fibers 54A, 54B. As shown in FIG. 5, the ribbon splice protector 60 has a much larger diameter or width than a diameter or width of each of the loose tube-type cables 52A, 52B. Moreover, the width of each one-dimensional array of optical fibers 54A, 54B proximate to the inner thermoplastic member 62 is also greater than the diameter of each of the first and second loose tube-type cables 52A, 52B. The benefits of small round cables are thus completely defeated if a cable assembly incorporating small round cables involves a fusion splice connection. The size of conventional one-dimensional array splice protection technology is limiting the practical attainment of higher fiber density in fiber optic modules and cable assemblies.

Another conventional method for protecting fusion splices is splice recoating. In a recoating process, a stripped and spliced fiber section is placed in a mold with an inner diameter matching the fiber coating diameter. Typically, UV-sensitive polymer recoat material (e.g., acrylate-based material) is injected into the mold to surround the bare glass cladding of the spliced fibers, and UV light cures the polymer recoat material in place to yield a recoated optical fiber having the same cross-sectional dimension as that of the original coated fiber. Fiber recoaters are manufactured by companies such as America Fujikura Ltd. (AFL) and Vytran (a division of Thorlabs, Inc.). While recoating provides benefits such as reduced size and increased flexibility relative to the use of heat shrink protection sleeves, the use of recoating has been limited to high-end applications such as submarine fiber fusion splicing. While recoated splices offer higher density than ribbon-type splice protectors, the absence of a strength member renders a splice region subject to bending, which may pose a long-term reliability concern. Moreover, even though recoating may attain a splice protector offering the same size as a flat ribbon, a resulting coated array of twelve one-dimensional fiber splices remains too wide to fit into a standard 2 mm or 3 mm outer diameter round cable jacket.

In view of the foregoing need remains in the art for high density multi-fiber cables and cable assemblies incorporating fusion splices that address the above-described and other limitations associated with conventional one-dimensional array-type splice protectors, as well as associated fabrication methods.

SUMMARY

Aspects of the present disclosure provide a fiber optic cable including a plurality of fusion spliced optical fibers, with a polymeric overcoating extending over a fusion splice region as well as over a stripped section of each optical fiber proximate to the fusion splice region, and with the plurality of fusion spliced optical fibers having a non-coplanar arrangement at the fusion splice region. A method for fabricating a fiber optic cable is also provided. Such a method comprises mass fusion splicing ends of first and second pluralities of optical fiber segments when arranged in aligned one-dimensional arrays to form a plurality of fusion spliced optical fibers and define a fusion splice region. A further step comprises contacting the fusion splices as well as stripped sections of the spliced optical fibers with polymeric material in a flowable state. Either before or after the contacting step, the method further comprises altering a position of at least some of the fusion spliced optical fibers to yield a configuration in which the plurality of fusion spliced optical fibers have a non-coplanar arrangement at the fusion splice region. The method additionally comprises solidifying the polymeric material.

To be clear, "fusion splice region" refers to a location or length of the fiber optic cable that includes the fusion splices between the optical fiber segments. If all the fusion splices are aligned in a plane, the fusion splice region is the location of that plane along the length of the fiber optic cable. If the fusion splices are not co-planer, the fusion splice region is defined between the two fusion splices that are furthest apart along the length of the fiber optic cable. Thus, term "fusion splice region" is not intended to include longer lengths of the fiber optic cable extending from the fusion splices.

In one embodiment of the disclosure, a fiber optic cable is provided. The fiber optic cable comprises a plurality of fusion spliced optical fibers. Each fusion spliced optical fiber includes two optical fiber segments joined together by a fusion splice, and each optical fiber segment includes a stripped section proximate to the fusion splice. The fiber optic cable further comprises a polymeric overcoating extending over the fusion splices and over the stripped section of each optical fiber segment. The fusion splices of the plurality of fusion spliced optical fibers define a fusion splice region of the fiber optic cable, and the plurality of fusion spliced optical fibers has a non-coplanar arrangement at the fusion splice region.

In accordance with another embodiment of the disclosure, a method for fabricating a fiber optic cable is provided. The method comprises arranging ends of a first plurality of optical fiber segments and ends of a second plurality of optical fiber segments in respective one-dimensional arrays that are aligned with one other. The method additionally comprises mass fusion splicing the ends of the first plurality of optical fiber segments to the ends of the second plurality of optical fiber segments to form a plurality of fusion spliced optical fibers each incorporating one optical fiber segment of the first plurality of optical fiber segments and one optical fiber segment of the second plurality of optical fiber segments. Fusion splices between the ends of the first plurality of optical fiber segments and the ends of the second plurality of optical fiber segments define a fusion splice region of the fiber optic cable, and each optical fiber segment of the first and second pluralities of optical fiber segments includes a stripped section proximate the fusion splice region. The method further comprises contacting the fusion splices of the plurality of fusion spliced optical fibers as well as at least a portion of the stripped section of each optical fiber segment with a polymeric material in a flowable state, The method additionally comprises altering position of at least some fusion spliced optical fibers of the plurality of fusion spliced optical fibers to yield a configuration in which the plurality of fusion spliced optical fibers has a non-coplanar arrangement at the fusion splice region. The method further comprises solidifying the polymeric material with the plurality of fusion spliced optical fibers in the non-coplanar arrangement at the fusion splice region.

In one embodiment of the disclosure, a fiber optic cable is provided. The fiber optic cable comprises first and second groups of fusion spliced optical fibers, wherein each fusion spliced optical fiber includes two optical fiber segments joined together by a fusion splice, each optical fiber segment includes a stripped section proximate to the fusion splice of the corresponding fusion spliced optical fiber. A polymeric overcoating extends over the fusion splices and over the stripped section of each optical fiber segment. The fusion splices define a fusion splice region of the fiber optic cable. The first group and the second group of fusion spliced optical fibers are arranged in respective first and second planes at the fusion splice region. The first and second planes extend in a lengthwise direction of the fiber optic cable and are definable through fiber cores of the respective first group and second group of fusion spliced optical fibers, and the first and second planes are non-coplanar.

Additional features and advantages will be set forth in the detailed description that follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
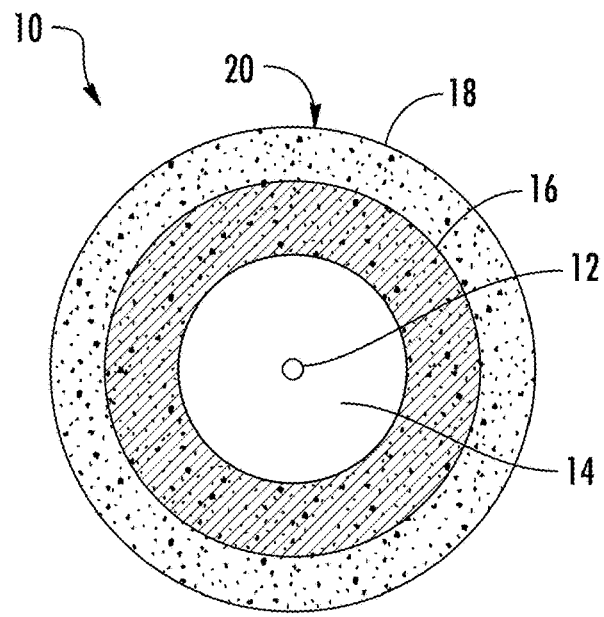
FIG. 1 is a cross-sectional view of a conventional coated optical fiber that may be subject to fusion splicing, prior to stripping of a multi-layer polymer coating from glass cladding.
Figure 2:
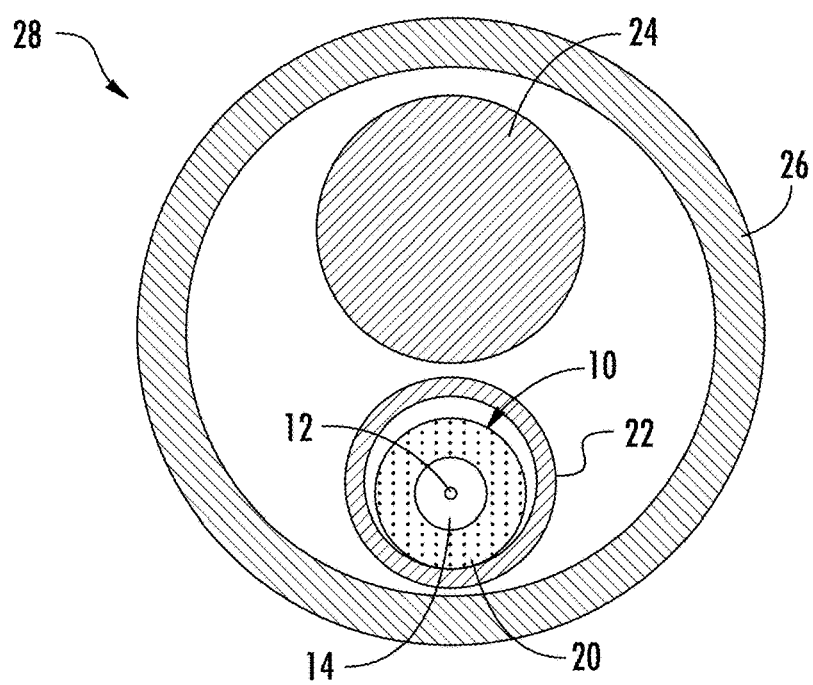
FIG. 2 is a cross-sectional view of a conventional splice protector including a heat shrink protection sleeve and an integrated strength member.
Figure 3A:
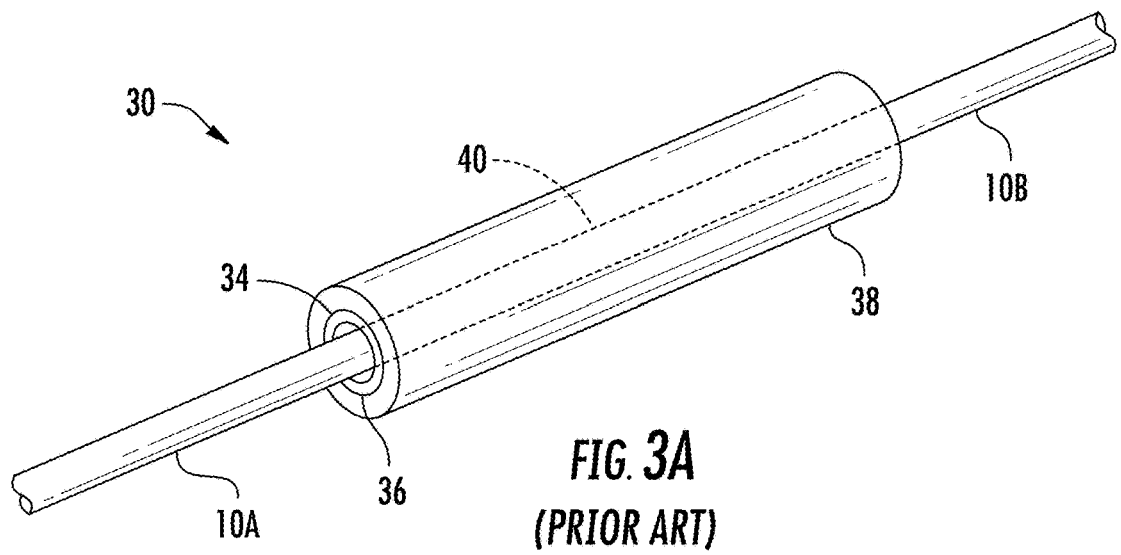
FIG. 3A is a schematic perspective view of a conventional heat shrink protection sleeve used to protect a splice joint between two optical fibers.
Figure 3B:
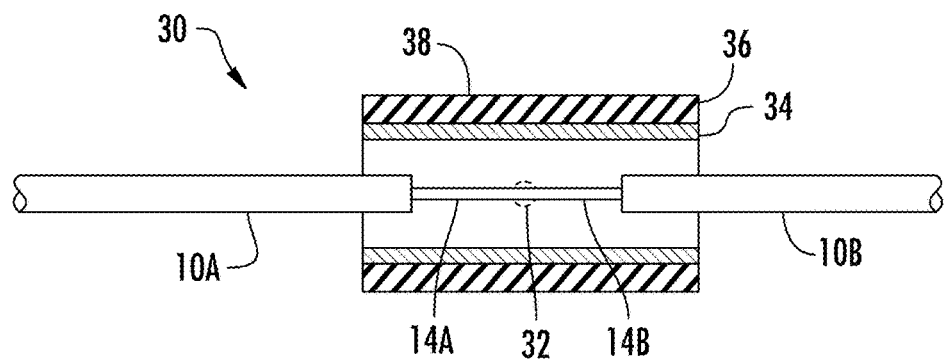
FIG. 3B is a schematic cross-sectional view of the heat shrink protection sleeve and optical fibers of FIG. 3A, with schematic illustration of the splice joint between stripped portions of the two optical fibers.
Figure 4:
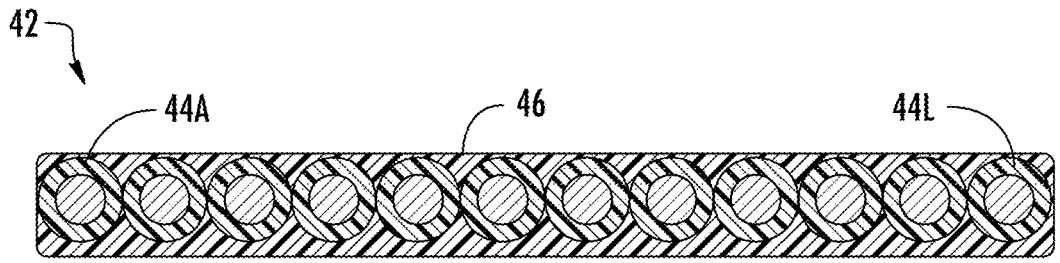
FIG. 4 is a cross-sectional view of a conventional optical fiber ribbon including twelve optical fibers.
Figure 5:
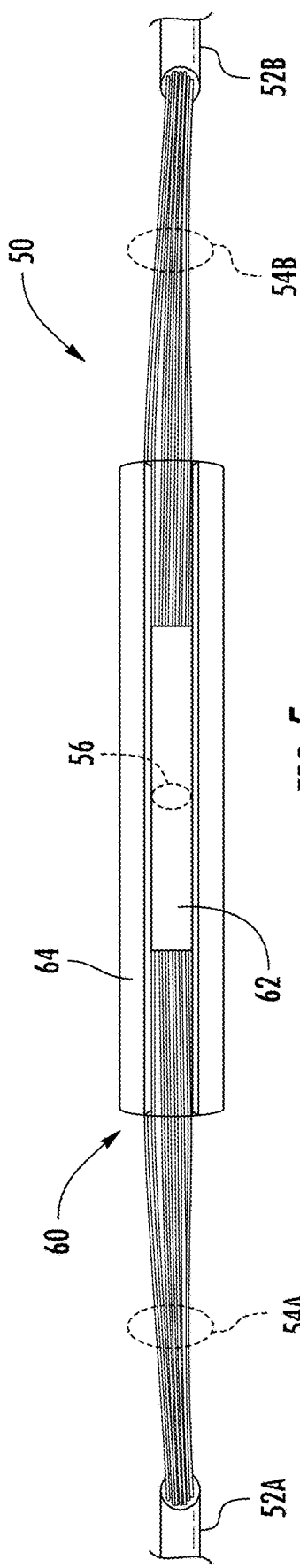
FIG. 5 illustrates segments of two small round-type fiber optic cables from which twelve loose fibers extend, with the loose fibers being spliced in a one-dimensional array and protected by a conventional multi-fiber heat shrink protection sleeve.

Various embodiments will be further clarified by examples in the description below. In general, the description relates to a fiber optic cable with overcoated non-coplanar groups of fusion spliced optical fibers, and a method for fabricating such a cable. The cable may be part of a cable assembly in which at least some of the fusion spliced optical fibers are terminated with fiber optic connectors.

In this disclosure, the language "fusion spliced optical fiber" refers to two optical fibers that have been fusion spliced together to form a permanent, optical link incorporating the two optical fibers. The singular noun "fusion spliced optical fiber" is used even though two optical fibers are initially present because, after fusion splicing, the resulting optical link is intended to function like a continuous optical fiber (even though there may be some attenuation resulting from the fusion splice joint). Using the singular form also facilitates discussions involving groups of these fusion spliced optical fibers, as will be apparent.

Likewise, in this disclosure, the two optical fibers that define a given "fusion spliced optical fiber" may alternatively be referred to as "optical fiber segments." Using the language "optical fiber segments" rather than "optical fibers" helps clarify when the disclosure is referring to one of the pairs of optical fibers that form one of the fusion spliced optical fibers, versus one of the fusion spliced optical fibers itself.

As will be discussed in more detail below, one exemplary aspect relates to a fiber optic cable that includes a plurality of fusion spliced optical fibers, with each fusion spliced optical fiber including two optical fiber segments that are arranged serially and joined together by a fusion splice. The fiber optic cable also includes a polymeric overcoating extending over the fusion splices of the plurality of fusion spliced optical fibers as well as over a stripped section of each optical fiber segment proximate to the fusion splice of the corresponding fusion spliced optical fiber (i.e., the fusion splice that joins the optical fiber segment in question to the other optical fiber of the serial arrangement). The fusion splice joints of the plurality of fusion spliced optical fibers define a fusion splice region of the fiber optic cable, and the plurality of fusion spliced optical fibers have a non-coplanar arrangement at the fusion splice region.

A "non-coplanar arrangement" in the fusion splice region is an arrangement in which the optical fibers of a plurality of fusion spliced optical fibers are not exclusively aligned (or exclusive substantially aligned) in a common plane that extends in a lengthwise direction of the fiber optic cable. In other words, there is no common plane, extending in a lengthwise direction of the fiber optic cable, that intersects all fusion spliced optical fibers at the fusion splice region (i.e., no substantial alignment in a common plane); or more specifically, there is no common plane, extending in a lengthwise direction of the fiber optic cable, that intersects a fiber core or each of the fusion spliced optical fibers at the fusion spliced region (i.e., no alignment in a common plane). Thus, "substantial alignment" refers to the fusion spliced optical fibers in general, whereas "alignment" is more precise and refers to fiber cores of the fusion spliced optical fibers. As can be appreciated, due to the non-coplanar arrangement at the fusion splice region, the fusion spliced optical fibers are not exclusively arranged in a one-dimensional array in a cross-sectional view perpendicular to the lengthwise direction of the fiber optic cable. Such an arrangement does not preclude the presence of two or more groups of fusion spliced optical fibers arranged in different one-dimensional arrays that in combination form a multi-dimensional array, so long as all fusion spliced optical fibers of the plurality of fusion spliced optical fibers are not arranged in a single one-dimensional array. The non-coplanar arrangement of fusion spliced optical fibers can be expressed by considering there to be multiple groups of the fusion spliced optical fibers, still with a polymeric overcoating extending over a fusion splice region as well as over a stripped section of each optical fiber segment. To this end, a first group of the fusion spliced optical fibers is arranged non-coplanar to a second group of the fusion spliced optical fibers at the fusion splice region.

As noted previously, current mass fusion splice technology and current fusion splice protection technology only support one-dimensional arrays of optical fiber splices. A fiber optic cable as disclosed herein may include mass fusion spliced optical fibers that are repositioned (after fusion splicing is completed) to a configuration other than a one-dimensional array, and overcoated or encapsulated with polymeric material.

In another exemplary aspect, a method for fabricating a fiber optic cable includes mass fusion splicing first and second pluralities of optical fiber segments arranged in a one-dimensional array to form a plurality of fusion spliced optical fibers. A further step includes contacting stripped sections of the fusion spliced optical fibers with polymeric material in a flowable state. Either before or after the contacting step, the method further includes altering position of (i.e., rearranging) at least some of the fusion spliced optical fibers to yield a configuration in which the fusion spliced optical fibers have a non-coplanar arrangement at the fusion splice region. The method further includes solidifying the polymeric material with the fusion spliced optical fibers in the non-coplanar arrangement at the fusion splice region.

In certain embodiments, the solidified polymeric material forms a polymeric overcoating that encapsulates the fusion splice region and the stripped sections of each optical fiber segment of the plurality of fusion spliced optical fibers. Such overcoating may also extend over a portion of a pre-coated (unstripped) section of each optical fiber.

The altering of position of at least some of the fusion spliced optical fibers to yield a configuration in which the plurality of fusion spliced optical fibers have a non-coplanar arrangement at the fusion splice region may be performed either before or after the fusion spliced optical fibers are contacted with polymeric material in a flowable state. In certain embodiments, the contacting of the fusion splices as well as at least a portion of the stripped sections of the fusion spliced optical fibers with a polymeric material in a flowable state is performed prior to the altering of position of at least some fusion spliced optical fibers. Conversely, in certain embodiments, the contacting of the fusion splices as well as at least a portion of the stripped sections of the fusion spliced optical fibers with a polymeric material in a flowable state is performed after the altering of position of at least some fusion spliced optical fibers. In certain embodiments, the contacting of at least a portion of the stripped sections with polymeric material in a flowable state comprises (i) coating at least a portion of the stripped sections with a first portion of polymeric material prior to the altering of position of at least some fusion spliced optical fibers; and (ii) coating at least a portion of the stripped sections with a second portion of polymeric material prior to the altering of position of at least some fusion spliced optical fibers. In certain embodiments, the first portion of polymeric material may be compositionally the same as the second portion of polymeric material, or the first and second portions of polymeric material may be compositionally different.

Various methods may be used to solidify polymeric material in a flowable state, depending on the character of the polymeric material. In certain embodiments, polymeric material may be solidified by supplying a chemical (e.g., a polymerization agent, which may optionally include water) to promote cross-linking between polymer chains. In certain embodiments, solidifying of the polymeric material may be accomplished by cooling the polymeric material. In certain embodiments, the contacting of at least a portion of the stripped section of each optical fiber segment of the plurality of fusion spliced optical fibers with the polymeric material in a flowable state is performed prior to the altering of position of at least some fusion spliced optical fibers, and the altering of position of at least some fusion spliced optical fibers is performed while the polymeric material in a flowable state is maintained at a melt flow temperature of the polymeric material.

In certain embodiments, polymeric material may be in a flowable state when initially contacted with stripped sections of optical fiber segments and fusion splices, at least partially solidified, and subsequently reflowed and resolidified. In certain embodiments, the contacting of at least a portion of the stripped sections of each optical fiber segment of the plurality of fusion spliced optical fibers with the polymeric material in a flowable state comprises coating the stripped sections with the polymeric material in a flowable state, and the contacting is performed prior to the altering of position of at least some fusion spliced optical fibers of the plurality of fusion spliced optical fibers. Thereafter, the altering of position of at least some fusion spliced optical fibers of the plurality of fusion spliced optical fibers comprises stacking a first group of fusion spliced optical fibers of the plurality of fusion spliced optical fibers over a second group of fusion spliced optical fibers of the plurality of fusion spliced optical fibers with polymeric material coated on the stripped sections during the contacting step arranged therebetween. In such a case, the polymeric material may be reheated after the altering of position of at least some fusion spliced optical fibers of the plurality of fusion spliced optical fibers to reflow and merge polymeric material arranged between (i) the first group of fusion spliced optical fibers and (ii) the second group of fusion spliced optical fibers.

In certain embodiments, at the fusion splice region following the alteration of position of at least some fusion spliced optical fibers, a first plane is definable through fiber cores of at least two fusion spliced optical fibers of a first group of fusion spliced optical fibers, a second plane is definable through fiber cores of at least two fusion spliced optical fibers of a second group of fusion spliced optical fibers, and the first and second planes are non-coplanar. Relative to maintaining the fusion spliced optical fibers in a single one-dimensional array, repositioning of the spliced optical fibers serves to reduce aggregate lateral dimensions of the fusion spliced optical fibers. The fusion spliced optical fibers and the polymeric material effectively form a composite that strongly resists torsion and bending in any direction, with the fusion spliced optical fibers collectively reinforcing one another. In certain embodiments, a fiber optic cable with overcoated non-coplanar groups of fusion spliced optical fibers may be devoid of a strength member spanning over the fusion splice region and/or may be devoid of heat shrink tubing arranged over the fusion splice region. In other embodiments, fiber optic cable with overcoated non-coplanar groups of fusion spliced optical fibers may include a strength member (e.g., a metal member, an additional polymer layer or material, a ceramic material, etc.) spanning over the fusion splice region. If an added strength member is provided, then such strength member may be adhered to an exterior of an polymeric overcoating material in certain embodiments.

The preceding reference to non-coplanar first and second planes definable through fiber cores of first and second groups of fusion spliced optical fibers, respectively, is neither intended to limit, nor serves to limit, the subject matter disclosed herein to fusion spliced optical fibers in a "two row" array. Any suitable configuration for arranging multiple groups of fusion spliced optical fibers, other than exclusively in a one-dimensional array, is contemplated by such language. In certain embodiments, a third group of fusion spliced optical fibers may be further provided, wherein at the fusion splice region, a third plane is definable through substantially parallel fiber cores of at least two optical fibers of the third group of fusion spliced optical fibers, with the first, second, and third planes being non-coplanar. In certain embodiments involving a total of twelve fusion spliced optical fibers, the fusion splice region may be configured as a 2×6 array, a 3×4 array, or a hexagonal close packed four-layer configuration, respectively. In certain embodiments, fusion spliced optical fibers may be placed in a spiral configuration so long as the fusion spliced optical fibers remain substantially parallel to one another (e.g., within one degree or within two degrees of deviation from parallel at any one position). Other configurations may be provided for groups of twelve fusion spliced fibers or for groups of fusion spliced fibers other than twelve in number. In certain embodiments, each group of optical fiber segments to be spliced may include 8, 12, 16, or 24 optical fibers. Other numbers of optical fibers may be provided. In certain embodiments, non-coplanar first and second groups of fusion spliced optical fibers each include at least three, or at least four, fusion spliced optical fibers. Such optical fibers may include single mode optical fibers or multi-mode optical fibers.

In certain embodiments, pre-coated (i.e., acrylate coated) optical fibers subject to being fusion bonded and overcoated (or encapsulated) according to methods disclosed herein are prepared for fusion bonding (e.g., by stripping ends thereof) utilizing non-contact fiber stripping methods and/or apparatuses, such as those disclosed in U.S. Pat. No. 9,167,626 ("the '626 Patent"), which is hereby incorporated by reference. Briefly, the '626 Patent discloses use of a heater configured for heating a heating region to a temperature above a thermal decomposition temperature of at least one coating of an optical fiber, a securing mechanism for securely positioning a lengthwise section of the optical fiber in the heating region, and a controller operatively associated with the heater and configured to deactivate the heater no later than immediately after removal of the at least one coating from the optical fiber. Thermal decomposition of at least one coating of an optical fiber reduces or minimizes formation of flaws in optical fibers that may be generated by mechanical stripping methods and that can reduce their tensile strength.

It is to be noted that optical fibers of a first plurality of segments and of a second plurality of segments to be fusion bonded may be arranged in first and second conventional fiber sorting fixtures, respectively, during the stripping and/ or fusion bonding steps. A typical fiber sorting fixture includes a slot closely each having an opening dimension (e.g., height) that closely matches a corresponding dimension of unbuffered, coated optical fibers to maintain portions of the optical fibers proximate to ends to be stripped (and subsequently fusion spliced) in fixed, substantially parallel positions embodying a one-dimensional array. In certain embodiments, coated optical fibers having outer diameters of either 200 µm or 250 µm may laterally abut one another in a fiber sorting fixture, such that cores of adjacent optical fibers are also spaced either 200 µm or 250 µm apart. After stripping of acrylate coating material from end sections (to form stripped sections) of the optical fibers, the remaining (bare glass) cladding and core portions are in a non-contacting (and non-crossing) relationship, and bare glass ends of the optical fibers may be fusion bonded using conventional fusion bonding method steps known to those skilled in the art. Mass fusion bonding may be used in any embodiments disclosed herein. Variations of the techniques disclosed in the '626 Patent are disclosed in U.S. Patent Application Publication Nos. 2016/0349453 and 2017/0001224, the disclosures of which are also hereby incorporated by reference herein. Non-contact stripping methods using lasers or hot gases are also possible in certain embodiments.

After a one-dimensional array of fusion spliced optical fibers is formed (and either before or after at least some optical fibers of the plurality of fusion spliced optical fibers are positioned into a configuration other than a one-dimensional array), at least a portion of the stripped sections of the fusion spliced optical fibers are contacted with polymeric material in a flowable state. Such polymeric material beneficially overcoats or encapsulates the splice region and stripped sections of the optical fibers, and preferably also overcoats portions of pre-coated sections of the optical fibers proximate to the stripped sections. In certain embodiments, the maximum width and height dimensions of the polymeric material in a resulting fiber optic cable are only slightly larger than maximum width and height dimensions of an array of pre-coated sections of the optical fibers proximate to the stripped sections. For example, in certain embodiments, the largest height and width portions of the polymeric material may correspond to areas in which the polymeric material overlaps the pre-coated (i.e., acrylate coated) sections of optical fibers. In certain embodiments, the polymeric material overlap region has a length of at least 3 mm. If the polymeric material has a thickness in such regions in a range of from 0.05 to 0.3 mm, then in certain embodiments, the greatest height and/or width portions of the polymeric material may exceed a greatest height and/or width portions of a corresponding array of pre-coated sections of optical fibers (proximate to the stripped sections of optical fibers) by dimensions in one of the following ranges: a range of from 0.1 to 0.6 mm, a range of from 0.2 to 0.6 mm, a range of from 0.1 to 0.5 mm, a range of from 0.2 to 0.5 mm, a range of from 0.2 to 0.4 mm, a range of from 0.2 to 0.3 mm, a range of from 0.3 to 0.6 mm, or a range of from 0.4 mm to 0.6 mm.

Figure 6:
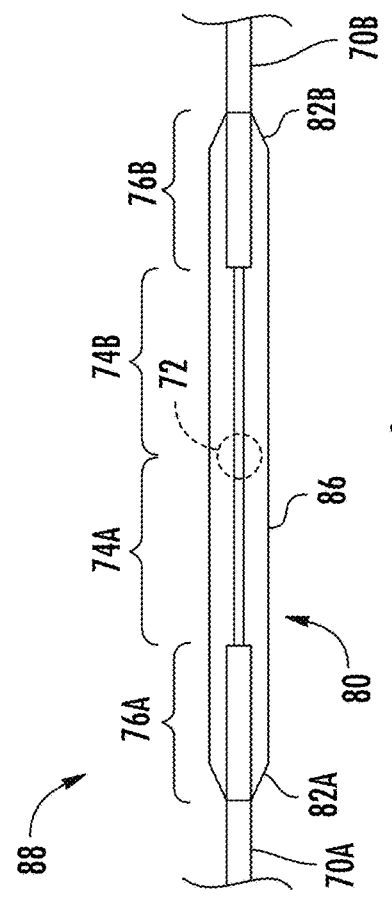
FIG. 6 is a schematic side view illustration of a fusion spliced section of optical fibers including a solid overcoating of thermoplastic material having a substantially constant thickness but an outer diameter that varies along intermediate portions thereof, with the solid overcoating of thermoplastic material arranged over stripped sections of the first and second optical fibers, a splice joint, and pre-coated sections of the first and second optical fibers.

To schematically illustrate the result of polymeric overcoating, FIG. 6 is a schematic side view illustration of an overcoated fusion spliced optical fiber 88 composed of optical fiber segments 70A, 70B, in which a solid overcoating 80 of thermoplastic material has a substantially constant outer diameter over the majority of its length. Each optical fiber segment 70A, 70B includes a coating, with portions of each optical fiber segment 70A, 70B being previously stripped of such coating to form stripped sections 74A, 74B embodying glass cladding. Ends of the stripped sections 74A, 74B are fusion spliced at a splice joint 72 to form the fusion spliced optical fiber 88. The solid overcoating 80 of polymeric material extends over the splice joint 72, the previously stripped sections 74A, 74B, and short lengths 76A, 76B of the coated optical fibers 70A, 70B. As shown in FIG. 6, the solid overcoating 80 may include tapered thickness ends 82A, 82B and a central section 86 having a substantially constant outer diameter that exceeds an outer diameter of the pre-coated optical fibers 70A, 70B, with the pre-coated optical fibers 70A, 70B including an outer diameter that includes that of the previously stripped sections 74A, 74B embodying glass cladding material.

As shown in FIG. 6, at least portions of the solid overcoating 80 of polymeric material include an outer diameter that exceeds an outer diameter of the pre-coated optical fibers 70A, 70B. The coated optical fibers 70A, 70B may each have a nominal outer diameter of 0.25 mm (250 µm) in some embodiments. In certain embodiments, the solid overcoating 80 of polymeric material may include an outer diameter in a range of from 0.2 mm to 0.9 mm, or from 0.2 mm to 0.7 mm, or from 0.2 to 0.5 mm, or from 0.25 mm to 0.9 mm, or from 0.25 to 0.7 mm, or from 0.25 to 0.5 mm.

Although only a single fusion spliced optical fiber 88 is shown in FIG. 6, it is to be appreciated that a solid overcoating similar to that shown in FIG. 6 may be applied to multiple fusion spliced optical fibers arranged in a one-dimensional array. In such a situation, the above-described outer diameter values for solid overcoating of polymeric material may correspond to thickness values for the solid overcoating applied to an array of fusion spliced optical fibers.

In certain embodiments, the polymeric material comprises a thermoplastic material that may be heated to a flowable state. In certain embodiments, the polymeric material in a flowable state comprises a photopolymerizable adhesive, such as a UV-curable polymeric material that may be solidified by impingement of ultraviolet emissions thereon. In certain embodiments, a polymeric material may be devoid of UV-curable components. In certain embodiments, the polymeric material in a flowable state comprises a moisture-curable polymeric material or a two-part adhesive that may be solidified by supplying moisture or a curing agent to the polymeric material. In certain embodiments, fusion spliced optical fibers may be temporarily placed in a cavity (e.g., a mold cavity), a housing, a trough, or a container in which polymeric material in a flowable state is present, or to which polymeric material in a flowable state is supplied. In certain embodiments, fusion spliced optical fibers may be dipped into a pool of molten thermoplastic material as part of the contacting step. In certain embodiments, a polymeric material that may be used to overcoat portions of fusion spliced optical fibers may include one or more of polyamide, polyolefin, a polyamide-polyolefin copolymer, a polyamide grafted polyolefin, and a copolyester. Other polymeric materials (including thermoplastic materials) may be used. In certain embodiments, a polymeric material that may be used to overcoat portions of fusion spliced optical fibers may include a melt-flow thermoplastic adhesive material.

In certain embodiments, a polymeric overcoating extending as disclosed herein is arranged over a splice joint, as well as over stripped sections and pre-coated sections of fusion spliced optical fibers (e.g., including at least a short distance of acrylate coated sections proximate to the stripped sections). At least a portion of the polymeric overcoating includes a diameter that exceeds a diameter of one or more pre-coated sections of the fusion spliced optical fibers.

Exemplary optical fibers include 250 µm or 200 µm diameter acrylate coated fibers without any additional buffer layer.

A desirable polymeric overcoating material is preferably not subject to delamination during normal handling over the required service conditions and lifetime of a fiber optic cable. In certain embodiments, flowable polymeric material used to fabricate a polymeric overcoating comprises molten thermoplastic material. To avoid thermal degradation of one or more acrylate coating layers of the pre-coated sections of the fusion spliced optical fibers, molten thermoplastic material to be used for overcoating should be maintained at a processing temperature below a melt temperature of the one or more acrylate coating layers. To promote formation of a suitable overcoating, the molten thermoplastic material may also be maintained at a processing temperature at which the molten thermoplastic material has a melt viscosity in a range of from about 100 centipoises (cps) to about 10,000 cps, or more preferably in a subrange of from about 1000 cps to about 10,000 cps, or more preferably in a subrange of from about 2000 cps to about 4000 cps.

In certain embodiments, desirable thermoplastic overcoating materials differ from conventional melt flow adhesive glue sticks or typical thermoplastic materials in that they should desirably: have a medium viscosity (e.g., according to one or more of the ranges outlined above) at a processing temperature, be chemically stable at the processing temperature, have a glass transition temperature of no greater than −40° C., have a service temperature spanning at least a range of from −40° C. to 85° C. without suffering significant mechanical and/or optical performance degradation, exhibit strong adhesion to fiber coating layers and bare glass, be free from charring, and/or exhibit minimal to no outgassing (e.g., of volatile organic compounds and/or other constituents). A glass transition temperature is the point at which a material goes from a hard brittle state to a flexible or soft rubbery state as temperature is increased. A common method for determining glass transition temperature uses the energy release on heating in differential scanning calorimetry. If a plastic (e.g., thermoplastic) material associated with an optical fiber is exposed to a temperature below its glass transition temperature, then the material will become very hard, and the optical fiber may be susceptible to micro bend losses. In certain embodiments, service temperature of a thermoplastic overcoating material may be determined by compliance with one or more industry standards for telecommunication fiber reliability testing, such as (but not limited to): ITU-T G.652, IED60793-2, Telcordia GR-20-CORE and TIA/EIA-492.

Formation of a solid thermoplastic overcoating over at least a short distance of pre-coated sections of optical fibers bounding a spliced segment (e.g., at either end of stripped sections joined at a splice joint) beneficially ensures that all previously stripped (glass) sections are fully overcoated. In certain embodiments, a solid thermoplastic overcoating extends over a length of a pre-coated section of each of the first and second optical fibers, wherein the overcoated length of each pre-coated section is in a range of from about 1 mm to about 10 mm. Additionally, since the solid thermoplastic overcoating may adhere to one or more coating layers of an optical fiber more readily than to (pre-stripped) exposed glass sections, providing a solid thermoplastic overcoating of sufficient length to overlap at least a short distance of pre-coated sections of optical fibers bounding a spliced segment promotes more secure adhesion between the solid thermoplastic overcoating and the fusion spliced segment as a whole. In certain embodiments, a solid thermoplastic overcoating and a fusion spliced segment utilize a thermoplastic material that is devoid of additives configured to promote adhesion to glass, such as silane. A solid thermoplastic overcoating as disclosed herein is preferably not subject to delamination during normal handling over the required service conditions and lifetime of a fiber optic cable.

In preferred embodiments, a solid thermoplastic overcoating is water-resistant and serves to block moisture from reaching the splice joint and the previously stripped glass region of a fusion spliced segment of optical fibers. This is beneficial since moisture is known to chemically interact with glass cladding of optical fibers and cause expansion of micro defects in the glass, thereby leading to long-term failure of optical fibers. The solid thermoplastic overcoating is preferably also devoid of sharp particles (e.g., inorganic filler particles) and air bubbles. The solid thermoplastic overcoating may also be devoid of a UV curable material. In certain embodiments, formation of air bubbles may be reduced by contacting stripped sections and pre-coated sections of fusion spliced first and second optical fibers with molten thermoplastic material in a subatmospheric pressure environment (e.g., in a range of from 0.01 to 0.9, or 0.1 to 0.8, or 0.1 to 0.7 times local atmospheric pressure), such as may be attained in a partially evacuated chamber or other enclosure.

After a one-dimensional array of fusion spliced optical fibers is formed (and either before or after at least a portion of the stripped sections of the fusion spliced optical fibers are contacted with polymeric material in a flowable state), a position of a second group of fusion spliced optical fibers is altered relative to a positon of a first group of fusion spliced optical fibers to yield a non-coplanar arrangement at the fusion splice region. For example, an initial collection of twelve fusion spliced optical fibers may be used to form a two-dimensional array (e.g., a 3×4 array, a 2×6 array, or a hexagonal close-packed configuration) by altering position of a second group of fusion spliced optical fibers (or second and third groups of fusion spliced optical fibers) relative to a first group of fusion spliced optical fibers. The altering of position of at least some spliced optical fibers preferably yields a non-coplanar arrangement. At the fusion splice region, a first plane is definable through parallel fiber cores of a first group of fusion spliced optical fibers of the plurality of fusion spliced optical fibers, a second plane is definable through parallel fiber cores of a second group of fusion spliced optical fibers of the plurality of fusion spliced optical fibers, and the first and second planes are non-coplanar.

Because conventional encapsulated optical fiber ribbons are not amenable to being bent or folded, fiber optic cable assemblies and fabrication methods disclosed herein preferably utilize loose optical fibers (e.g., stranded optical fibers emanating from a cable jacket), a rollable or pliable fiber ribbon, or a standard fiber ribbon from which an inter-fiber polymer binding matrix has been (at least locally) removed. Thus, in certain embodiments, at a region distal from a fusion splice region, each group of optical spliced optical fibers may be embodied in (i) a rollable ribbon contained within a cable jacket or an encapsulant, (ii) a plurality of stranded optical fibers contained within a cable jacket, or (iii) a fiber ribbon from which an inter-fiber polymer binding matrix has been (at least locally) removed.

In certain embodiments involving loose optical fibers (e.g., as may emanate from a cable jacket containing stranded optical fibers), the loose fibers may be bonded by flexible polymer adhesives before being processed by coating, stripping, cleaving, and mass fusion splicing. Such bonding provides dimensional stability to the loose fibers during subsequent steps of polymeric material overcoating/encapsulation as well as positioning of optical fiber groups into a configuration other than a one-dimensional array. In such an embodiment, at least portions of flexible polymer adhesive material may be overcoated with polymeric material during one or more steps of polymeric material overcoating or encapsulation. In one embodiment involving a first group of loose, pre-coated (i.e., acrylate coated) optical fibers, the first group of optical fibers may be flexibly adhered into a first one-dimensional flexible fiber array having a length of at least about 60 mm. Thereafter, coating material may be stripped from ends of the first group of pre-coated optical fibers, and stripped ends of the first group of pre-coated optical fibers may be cleaved to form stripped sections of optical fibers suitable for fusion splicing. If the first group of optical fibers is to be fusion spliced to a second group of loose, pre-coated optical fibers, then the second group of optical fibers may be flexibly adhered into a second one-dimensional flexible fiber array having a length of at least about 60 mm. Thereafter, coating material may be stripped from ends of the second group of pre-coated optical fibers, and stripped ends of the second group of pre-coated optical fibers may be cleaved to form stripped sections of optical fibers also suitable for fusion splicing.

Various dimensions for stripped sections of optical fibers may be provided. In certain embodiments, the stripped segment of each optical fiber prior to fusion bonding has a length in a range of from 3 mm to 12 mm, or from 5 mm to 11 mm, or 6 mm to 12 mm, or 8 mm to 11 mm. Following fusion bonding between stripped segments, the stripped length portion of each fusion bonded optical fiber may be double the previously recited ranges (or about 20 mm in certain embodiments).

In certain embodiments, first and second pluralities of optical fibers subject to being fusion spliced to one another. In certain embodiments, optical fibers of the first plurality of optical fibers have the same coating diameter as optical fibers of the second plurality of optical fibers. In certain embodiments, optical fibers of the first plurality of optical fibers have a first coating diameter that differs from a second coating diameter of optical fibers of the second plurality of optical fibers. In certain embodiments, the first plurality of optical fibers is at least initially contained in a fiber optic cable of one type, and the first plurality of optical fibers is at least initially contained in a fiber optic cable of the same type. In certain embodiments, the first plurality of optical fibers is at least initially contained in a fiber optic cable of a first type, and the first plurality of optical fibers is at least initially contained in a fiber optic cable of a second type that differs from the first type.

As noted previously, the fabrication steps of (a) positioning one or more groups of optical fibers into a configuration other than a one-dimensional array and (b) contacting at least a portion of the stripped sections of the fusion spliced optical fibers with polymeric material in a flowable state, may be performed in any suitable order. In certain embodiments, the foregoing repositioning step (a) may be performed prior to the contacting step (b). In certain embodiments, the foregoing contacting step (b) may be performed prior to the repositioning step (a). Following the preceding steps, the polymeric material is solidified. In certain embodiments, solidification of the polymeric material serves to encapsulate all stripped sections of the plurality of fusion spliced optical fibers, as well as the fusion splice region and portions of the pre-coated sections of optical fibers proximate to the stripped sections.

In certain embodiments, the contacting at least a portion of the stripped sections of the fusion spliced optical fibers with polymeric material in a flowable state may include coating at least a portion of the stripped sections with a first portion of polymeric material prior to the altering of position of at least some spliced optical fibers of the plurality of fusion spliced optical fibers, and coating at least a portion of the stripped sections with a second portion of polymeric material in a flowable state after the altering of position of at least some spliced optical fibers of the plurality of fusion spliced optical fibers. Restated, such a method may include an initial polymeric material contacting step, followed by positioning of groups of fusion spliced optical fibers into a configuration other than a one-dimensional array, followed by a subsequent polymeric material contacting step.

In certain embodiments, one or more after contacting at least a portion of the stripped sections of the fusion spliced optical fibers with polymeric material in a flowable state, the polymeric material may be at least partially solidified, followed by reflowing at least a portion the polymeric material (e.g., by reheating of a thermoplastic material) (with the reflowing optionally including incorporation of additional polymeric material), and followed by full solidification of the reflowed polymeric material. Such reflowing may be beneficial in cases where a polymeric material is partially hardened around a one-dimensional array of fusion spliced optical fibers, and groups of fusion spliced optical fibers overcoated with partially hardened thermoplastic material are stacked onto or otherwise contacted with one another.

Various methods may be used to alter position of at least some fusion spliced optical fibers. In certain embodiments, mass fusion spliced fibers may be overcoated with thermoplastic material and separated into a number of subarrays each including multiple coated optical fibers. The subarrays are then stacked in a fixture, and polymer coated splice regions are heated above the melt flow temperature of the thermoplastic material and subsequently cooled. Such process causes the thermoplastic overcoating between the subarrays to coalesce and form an encapsulated two-dimensional high density encapsulated splice.

In certain embodiments, the altering of position of at least some spliced optical fibers of a plurality of fusion spliced optical fibers includes rolling the at least some spliced optical fibers in a direction perpendicular to fiber cores of the spliced optical fibers. Such a step may be useful for forming an overcoated fiber optic cable portion having a cross-section in a hexagonal close-packed configuration. In certain embodiments, such rolling may be combined with twisting to form an overcoated fiber optic cable portion having optical fibers arranged in a spiral configuration.

In certain embodiments, the altering of position of at least some spliced optical fibers of a plurality of fusion spliced optical fibers includes a folding a first group fusion spliced optical fibers (e.g., in a direction perpendicular to fiber cores of fusion spliced optical fibers) in a manner causing the first group of fusion spliced optical fibers to overlie the second group of fusion spliced optical fibers. Such a step may be useful for forming an overcoated fiber optic cable portion having a cross-section with a rectangular shape. As an alternative to folding, in certain embodiments the altering of position of at least some spliced optical fibers of a plurality of fusion spliced optical fibers may include stacking a first group of fusion spliced optical fibers over a second group of fusion spliced optical fibers.

Figure 7A:
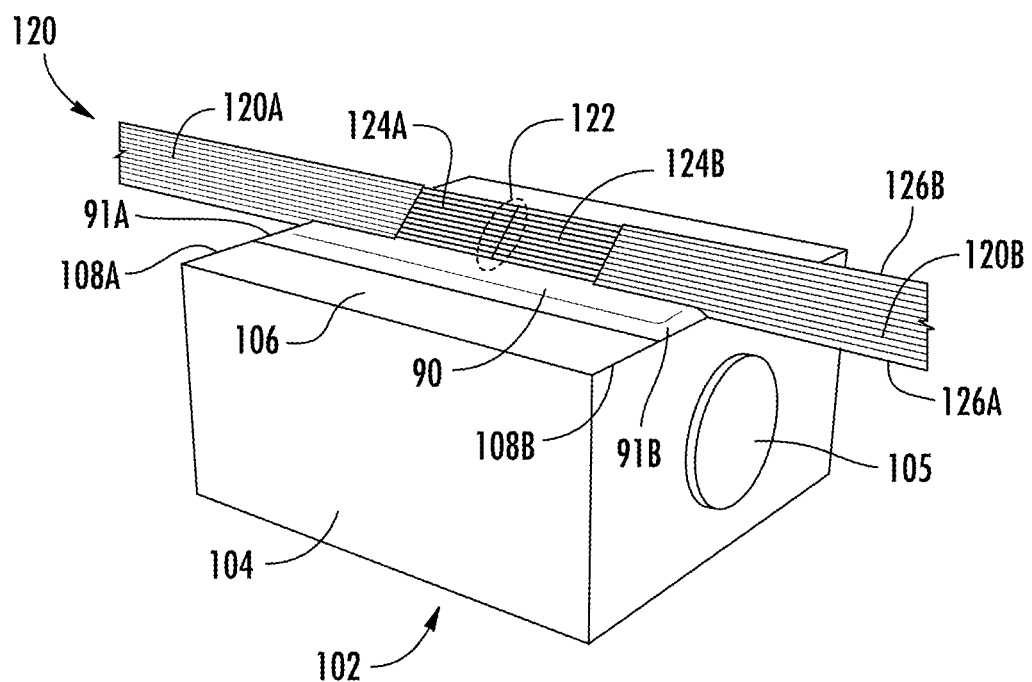
FIG. 7A is an upper perspective view illustration of a bare, mass fusion spliced section of two multi-fiber ribbon segments forming a spliced ribbon cable, with a first lateral edge portion of the spliced ribbon cable submerged in a pool of molten thermoplastic material atop a substantially level, flat heated surface, and with the ribbon cable being tilted at an approximately forty-five degree angle during a ribbon cable insertion step, such that a second lateral edge portion of the spliced ribbon cable is arranged at a level above the first lateral edge portion.
Figure 7B:
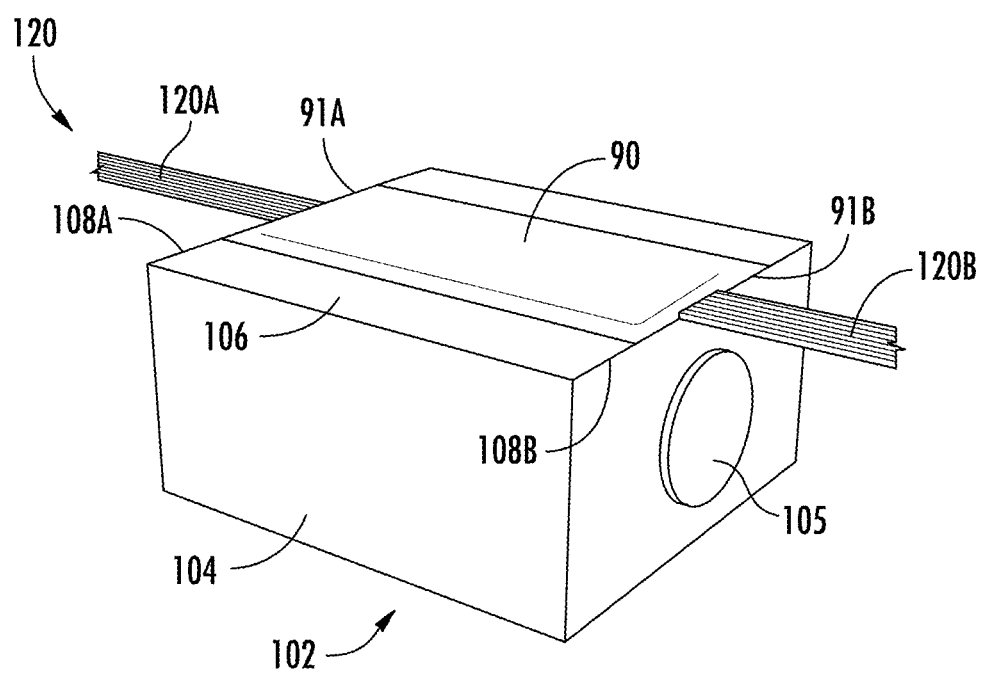
FIG. 7B illustrates the items of FIG. 7A, with the entire mass fusion spliced section of the spliced ribbon cable disposed in the pool of molten thermoplastic material atop the substantially level, flat heated surface, and with the first lateral edge portion being arranged at substantially the same horizontal level as the second lateral edge portion of the spliced ribbon cable.

FIGS. 7A and 7B illustrate a heating apparatus 102 useable for coating multiple fusion spliced optical fibers 120 with thermoplastic material. The multiple fusion spliced optical fibers 120 are composed of a first group of optical fiber segments 120A and a second group of optical fiber segments 120B, with ends of stripped sections 124A, 124B of the optical fiber segments 120A, 120B being fusion spliced at a fusion splice region 122. The heating apparatus 102 includes a body 104 that contains an internal electric cartridge heater 105. A pool of molten thermoplastic material 90 is arranged atop a substantially level, flat heated surface 106. Lateral edges 91A, 91B of the pool of molten thermoplastic material 90 extend to lateral edges 108A, 108B of the flat heated surface 106 without overflowing, due to lower temperature at the lateral edges 108A, 108B as well as surface tension of the molten thermoplastic material 90. FIG. 7A illustrates the fusion spliced optical fibers 120 arranged above the pool of molten thermoplastic material 90, with the splice joint 122 roughly centered above the pool, and with the length of the pool exceeding the combined length of the stripped sections 124A, 124B. As shown, a first side 126A of the fused optical fibers 120 initially contacts the pool of molten thermoplastic material 90, while the second side 126B of the fusion spliced optical fibers 120 remains elevated above the pool. Thereafter, the remainder of the fusion spliced optical fibers 120 gradually tilts to a more horizontal orientation and is submerged into the pool, as shown in FIG. 7B. Such figure shows the stripped sections 124A, 124B and the splice joint 122 of the fusion spliced optical fibers 120 submerged in the pool of molten thermoplastic material 90.

Thereafter, the multiple fusion spliced optical fibers 120 may be removed from the pool of molten thermoplastic material 90 in substantially a reverse manner from which it was introduced into the pool, and the molten liquid contacting the fusion spliced optical fibers 120 may be cooled to yield a solid thermoplastic overcoating that extends over the previously stripped sections 124A, 124B, the splice region 122, and portions of the first and second pluralities of optical fiber segments 120A, 120B that were previously unstripped. In certain embodiments, the solid thermoplastic overcoating may comprise a melt-flow thermoplastic adhesive material, such as TECHNOMELT® PA 6208 polyamide material (Henkel Corp., Dusseldorf, Germany). Such material exhibits a heat resistance temperature greater than 90° C., a melt flow temperature lower than 260° C., a melt viscosity between 100 cps and 10,000 cps, and a hardness of at least Shore A 45. Further details regarding thermoplastic overcoating of fusion spliced optical fibers and/or portions of fiber optic cable assemblies are disclosed in International Application No. PCT/US2018/021685 filed on Mar. 9, 2018, wherein the content of the foregoing application is hereby incorporated by reference herein.

Figure 8A:
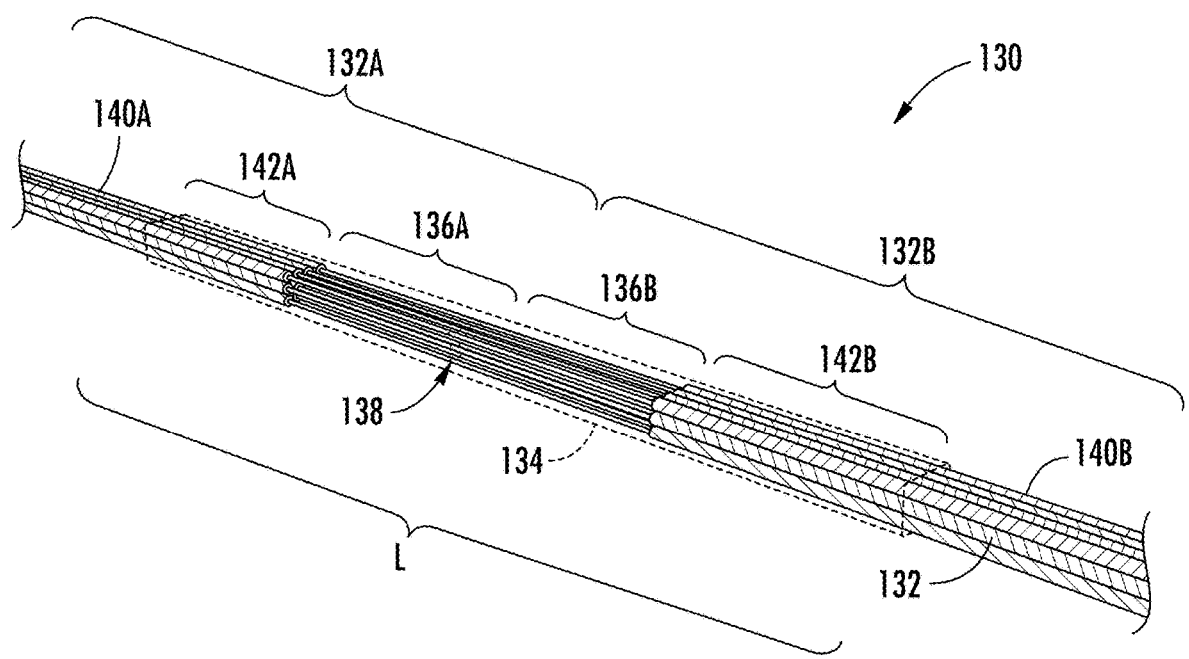
FIG. 8A is a perspective view of a portion of a fiber optic cable with non-coplanar groups of fusion spliced optical fibers that form a 3×4 array, and overcoating material that extends over stripped sections of the fusion spliced optical fibers and the splice region.
Figure 8B:
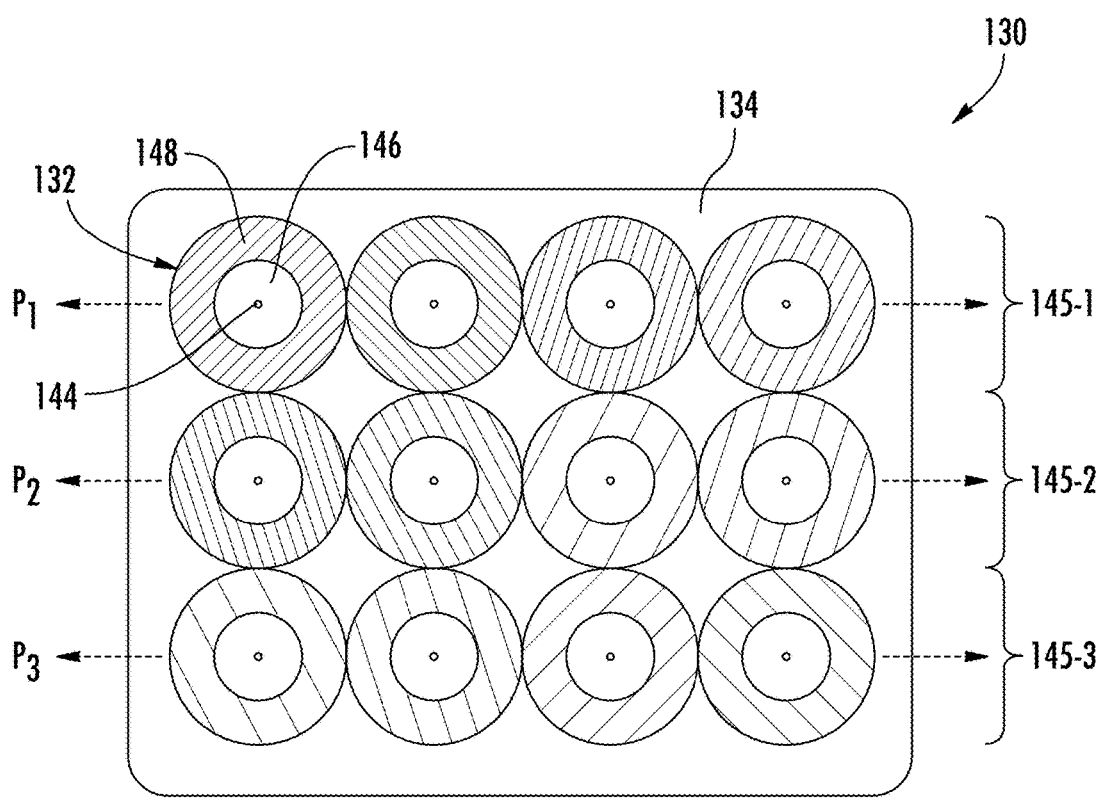
FIG. 8B is a cross-sectional view of the fiber optic cable of FIG. 8A.

FIGS. 8A and 8B provide perspective and cross-sectional views, respectively, of a fiber optic cable 130 with twelve fusion spliced optical fibers 132 arranged in a 3×4 array, and overcoating material 134 that extends over stripped sections 136A, 136B of the fusion spliced optical fibers 132 and a fusion splice region 138. The fusion spliced optical fibers 132 include first and second pluralities of fiber optic segments 132A, 132B that each include a pre-coated section 140A, 140B and a stripped section 136A, 136B, with ends of the stripped sections 136A, 136B being fusion spliced to one another at the fusion splice region 138. The overcoating material 134 has a length L sufficient to cover not only the stripped sections 136A, 136B and the fusion splice region 138, but also portions of the pre-coated sections 140A, 140B of the fusion spliced optical fibers 132 to form overlap regions 142A, 142B. FIG. 8B provides a cross-sectional view taken through one of these overlap regions 142A. Referring to FIG. 8B, in the overlap region 142A, each fusion spliced optical fiber 132 includes a glass core 144, glass cladding 146, and an acrylate coating 148. As shown, the acrylate coating 148 of each optical fiber 132 may be arranged in contact with an acrylate coating of at least one other optical fiber within the 3×4 array; however, in the stripped sections 136A, 136B of FIG. 8A, the stripped (glass) sections 136A, 136B are arranged in parallel without contacting one another, and the overcoating material 134 directly contacts glass material (i.e., cladding material 146 as shown in FIG. 8B) of the stripped sections 136A, 136B. With continued reference to FIG. 8B, the array of optical fibers 132 may be segregated in three optical fiber groups 145-1, 145-2, 145-3. Within each optical fiber group 145-1, 145-2, 145-3, a plane $P_1$, $P_2$, $P_3$ is definable through glass cores 144 of at least two (or as illustrated, three) optical fibers of that group. As shown, the three planes $P_1$, $P_2$, $P_3$ are non-coplanar. The 3×4 array configuration of fusion spliced optical fibers 132 shown in FIGS. 8A and 8B is significantly narrower than a width that would result from arranging the twelve fusion spliced optical fibers 132 in a one dimensional (i.e., 1×12) array. In certain embodiments, the maximum cross-sectional dimension (e.g., maximum width) of an encapsulated area of the fiber optic cable 130 (e.g., corresponding to one of the overlap regions 142A, 142B) is within a diameter of 1.3 mm, which enables the fiber optic cable 130 to easily fit into the 1.5 mm inner diameter of a 2 mm outer diameter cable jacket. This dimension is significantly reduced in comparison to the 3.1 mm width of a standard optical fiber ribbon.

Figure 9A:
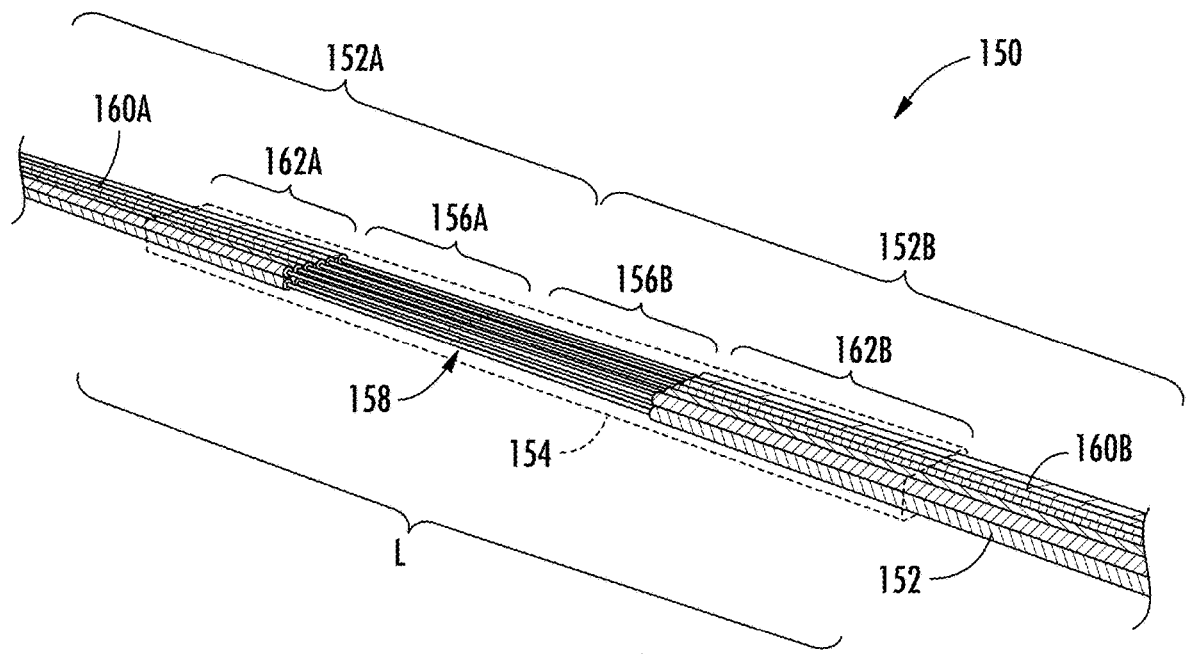
FIG. 9A is a perspective view of a portion of a fiber optic cable with non-coplanar groups of fusion spliced optical fibers that form a 2×6 array, and overcoating material that extends over stripped sections of the fusion spliced optical fibers and the splice region.
Figure 9B:
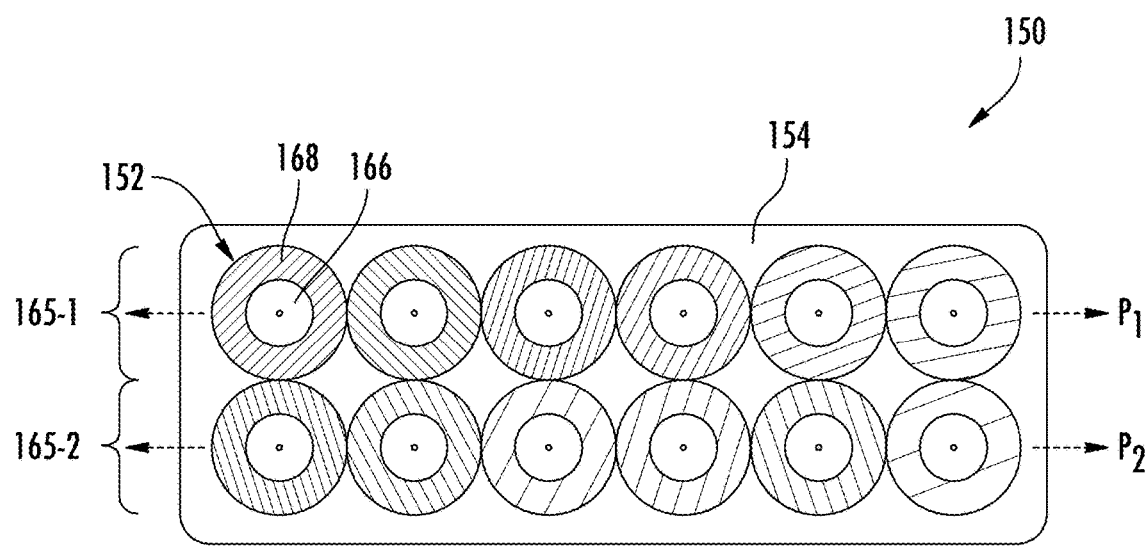
FIG. 9B is a cross-sectional view of the fiber optic cable of FIG. 9A.

FIGS. 9A and 9B provide perspective and cross-sectional views, respectively, of a fiber optic cable 150 with twelve fusion spliced optical fibers 152 arranged in a 2×6 array, and overcoating material 154 that extends over stripped sections 156A, 156B of the fusion spliced optical fibers 152 and over a fusion splice region 158. The fusion spliced optical fibers 152 include first and second pluralities of fiber optic segments 152A, 152B that each include a pre-coated section 160A, 160B and a stripped section 156A, 156B, with ends of the stripped sections 156A, 156B being fusion spliced to one another at the fusion splice region 158. The overcoating material 154 has a length L sufficient to cover not only the stripped sections 156A, 156B and the fusion splice region 158, but also portions of the pre-coated sections 160A, 160B of the fusion spliced optical fibers 152 to form overlap regions 162A, 162B. FIG. 9B provides a cross-sectional view taken through one of these overlap regions 162A. Referring to FIG. 9B, in the overlap region 162A, each fusion spliced optical fiber 152 includes a glass core, glass cladding 166, and an acrylate coating 168. As shown, the acrylate coating 168 of each optical fiber 152 may be arranged in contact with an acrylate coating of at least one other optical fiber within the 2×6 array; however, in the stripped sections 156A, 156B of FIG. 9A, the stripped (glass) sections 156A, 156B are arranged in parallel without contacting one another, and the overcoating material 154 directly contacts glass material (i.e., cladding material 166 as shown in FIG. 9B) of the stripped sections 156A, 156B. With continued reference to FIG. 9B, the array of optical fibers 152 may be segregated in two optical fiber groups 165-1, 165-2. Within each optical fiber group 165-1, 165-2, a plane $P_1$, $P_2$, is definable through glass cores of at least two (or as illustrated, six) optical fibers of that group. As shown, the two planes $P_1$, $P_2$ are non-coplanar. The 2×6 array configuration of fusion spliced optical fibers 152 shown in FIGS. 9A and 9B is significantly narrower than a width that would result from arranging the twelve fusion spliced optical fibers 152 in a 1×12 array (although not as narrow as the 3×4 array configuration shown in FIGS. 8A and 8B). The fusion spliced optical fibers 152 shown in FIGS. 9A and 9B is amenable to being positioned in the depicted 2×6 array configuration by two-layer folding, which is relatively simple among various positioning methods disclosed herein. A tradeoff associated with this ease of manufacture is that the fiber optic cable 150 exhibits reduced stiffness against bending along the short axis, separately from the larger width relative to the embodiment of FIGS. 8A-8B. In certain embodiments, the maximum cross-sectional dimension of an encapsulated area of the fiber optic cable 150 (e.g., corresponding to one of the overlap regions 162A, 162B) is 1.67 mm, which enables the fiber optic cable 150 to easily fit into a 3 mm outer diameter cable jacket.

Figure 10A:
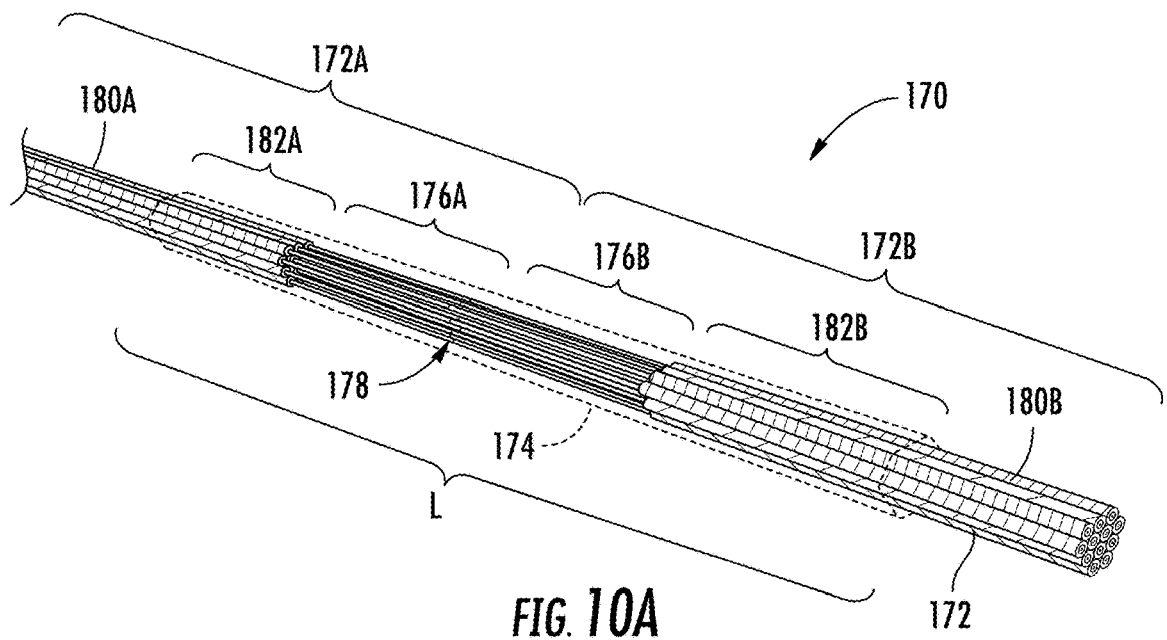
FIG. 10A is a perspective view of a portion of a fiber optic cable with non-coplanar groups of fusion spliced optical fibers that form a hexagonal close packed four-layer configuration, and overcoating material that extends over stripped sections of the fusion spliced optical fibers and the splice region.
Figure 10B:
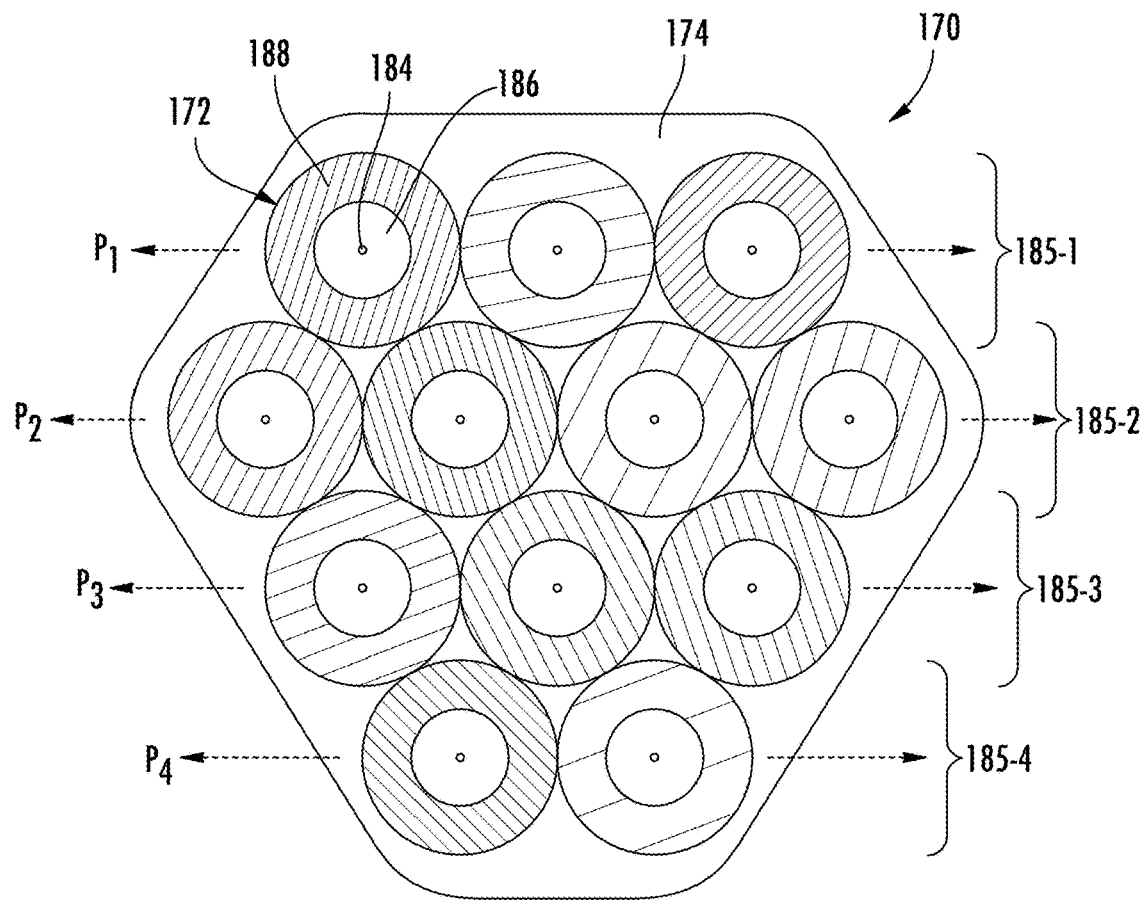
FIG. 10B is a cross-sectional view of the fiber optic cable of FIG. 10A.

FIGS. 10A and 10B provide perspective and cross-sectional views, respectively, of a fiber optic cable 170 with twelve fusion spliced optical fibers 172 arranged in a hexagonal close packed four-layer configuration, and overcoating material 174 that extends over stripped sections 176A, 176B of the fusion spliced optical fibers 172 and over a fusion splice region 178. The fusion spliced optical fibers 172 include first and second pluralities of fiber optic segments 172A, 172B that each include a pre-coated section 180A, 180B and a stripped section 176A, 176B, with ends of the stripped sections 176A, 176B being fusion spliced to one another at the fusion splice region 178. The overcoating material 174 has a length L sufficient to cover not only the stripped sections 176A, 176B and the fusion splice region 178, but also portions of the pre-coated sections 180A, 180B of the fusion spliced optical fibers 172 to form overlap regions 182A, 182B. FIG. 10B provides a cross-sectional view taken through one of these overlap regions 182A. Referring to FIG. 10B, in the overlap region 182A, each fusion spliced optical fiber 172 includes a glass core 184, glass cladding 186, and an acrylate coating 188. As shown, the acrylate coating 188 of each optical fiber 172 may be arranged in contact with an acrylate coating of at least one other optical fiber within the hexagonal close packed four-layer configuration; however, in the stripped sections 176A, 176B of FIG. 10A, the stripped (glass) sections 176A, 176B are arranged in parallel without contacting one another, and the overcoating material 174 directly contacts glass material (i.e., cladding material 186 as shown in FIG. 10B) of the stripped sections 176A, 176B. With continued reference to FIG. 10B, the hexagonal close packed four-layer configuration of optical fibers 172 may be segregated in four optical fiber groups 185-1, 185-2, 185-3, 185-4. Within each optical fiber group 185-1, 185-2, 185-3, 185-4, a plane $P_1, P_2, P_3, P_4$ is definable through glass cores 184 of at least two (or as illustrated, three or four in certain instances) optical fibers of that group. As shown, the four planes $P_1, P_2, P_3, P_4$ are non-coplanar. The hexagonal close packed four-layer configuration of fusion spliced optical fibers 172 shown in FIGS. 10A and 10B is significantly narrower than a width that would result from arranging the twelve fusion spliced optical fibers 172 in a 1×12 array, and also narrower than 3×4 and 2×6 array configurations shown in FIGS. 8A-8B and FIGS. 9A-9B. In certain embodiments, the maximum cross-sectional dimension of an encapsulated area of the fiber optic cable 170 (e.g., corresponding to one of the overlap regions 182A, 182B) is 1.0 mm, which enables the fiber optic cable 150 to easily fit into a 3 mm outer diameter cable jacket.

Figure 11A:
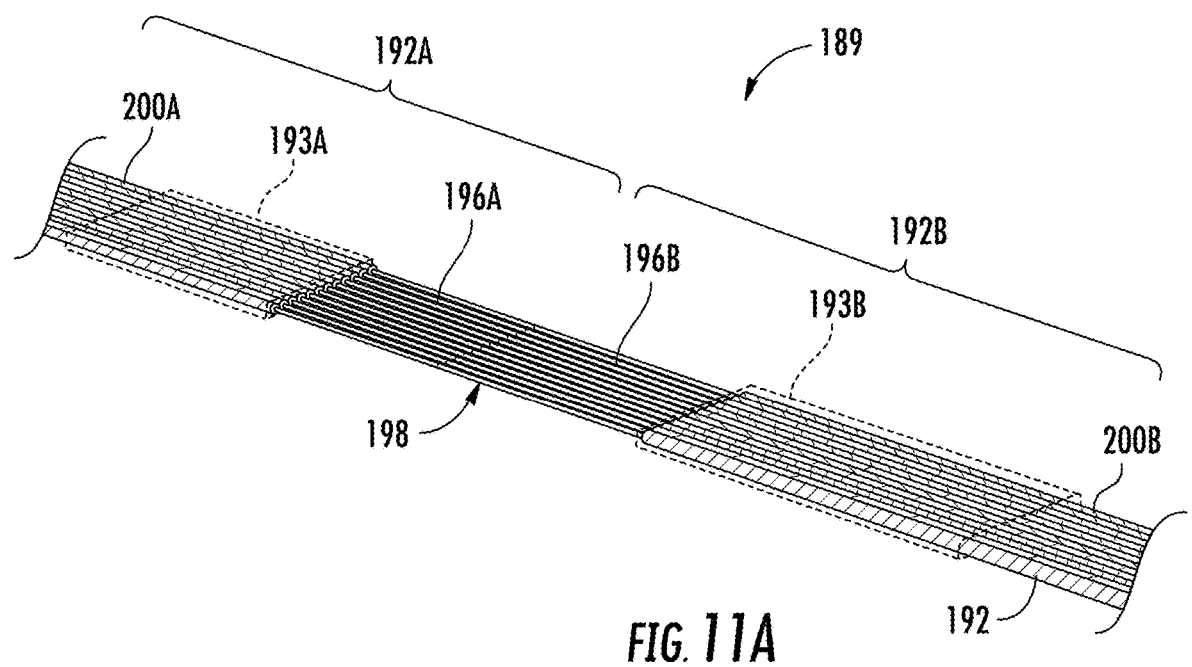
FIG. 11A is a perspective view of a portion of a fiber optic cable subassembly during fabrication, showing a one-dimensional array of twelve fusion spliced optical fibers, following adhesive binding of pre-coated sections of the fusion spliced optical fibers to maintain positioning of optical fibers in preparation for thermoplastic overcoating.

As noted previously herein, in certain embodiments loose fibers may be bonded by flexible polymer adhesives before being processed by coating, stripping, cleaving, and mass fusion splices, with such bonding being useful to provide dimensional stability of the fibers during subsequent processing steps. FIG. 11A is a perspective view of a portion of a fiber optic cable subassembly 189 during fabrication, with twelve fusion spliced optical fibers 192 arranged in a one-dimensional array, and being devoid of overcoating material over stripped sections 196A, 196B of the fusion spliced optical fibers 192. The fusion spliced optical fibers 192 include first and second pluralities of fiber optic segments 192A, 192B that each include a pre-coated section 200A, 200B and a stripped section 196A, 196B, with ends of the stripped sections 196A, 196B being fusion spliced to one another at the fusion splice region 198. As shown, flexible polymer adhesive binding material regions 193A, 193B are provided over portions of the pre-coated sections 200A, 200B of the first and second pluralities of fiber optic segments 192A, 192B. In certain embodiments, flexible polymer adhesive binding material 193A, 193B may be used to flexibly adhere fiber optic segments of the first and second pluralities of fiber optic segments 192A, 192B prior to stripping of acrylate coating material from ends of the fiber optic segments 192A, 192B, and prior to cleaving of stripped ends of fiber optic segments 192A, 192B. At least portions of flexible polymer adhesive binding material regions 193A, 193B are subject to being subsequently overcoated with polymeric material during overcoating of the stripped segments 196A, 196B and the fusion splice region 198.

Figure 11B:
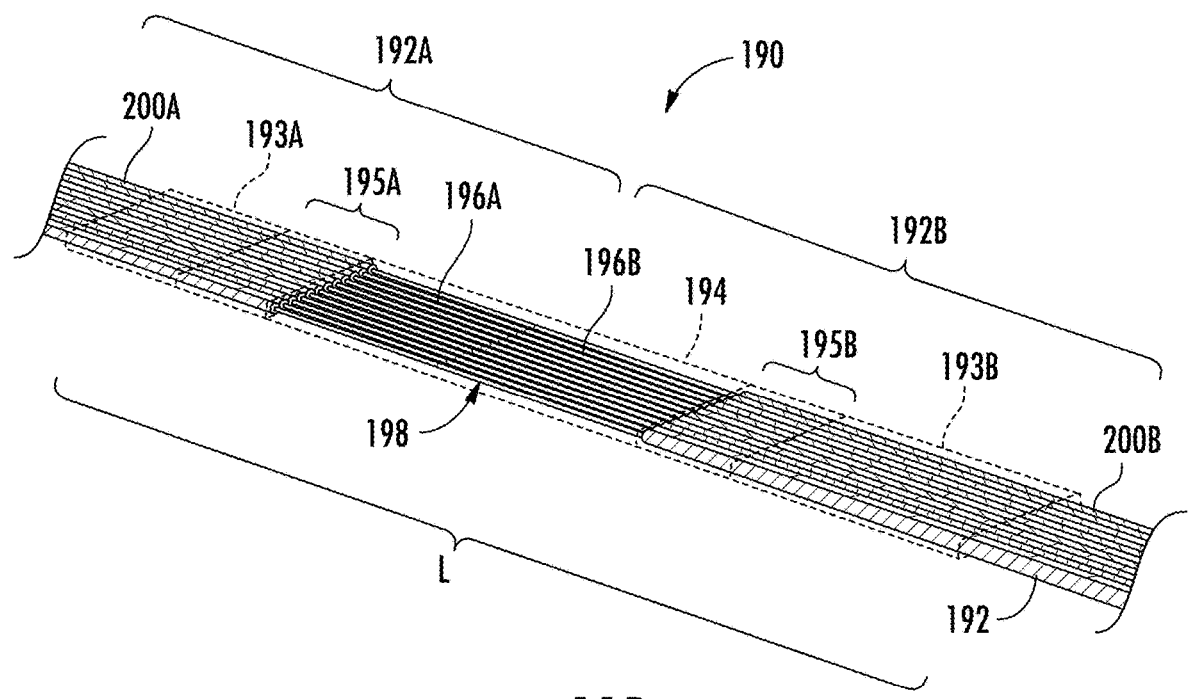
FIG. 11B is a perspective view of a completed portion of a fiber optic cable incorporating the subassembly of FIG. 11A, following addition of polymeric overcoating material that extends over stripped sections of the fusion spliced optical fibers, the splice region, and portions of the adhesively bound pre-coated sections.

FIG. 11B illustrates a fiber optic cable 190 incorporating the subassembly of FIG. 11A, following formation of a polymeric overcoating 194 extending over the stripped segments 196A, 196B and the fusion splice region 198. The polymeric overcoating 194 further extends over portions of the flexible polymer adhesive binding material regions 193A, 193B to form polymeric material overlap regions 195A, 195B. In certain embodiments, a length of each polymeric material overlap region 195A, 195B is at least about 3 mm in a direction parallel to fiber cores of the fusion spliced optical fibers 192. The remaining elements of FIG. 11B are identical to those described in FIG. 11A, and will not be described again for sake of brevity.

Figure 12A:
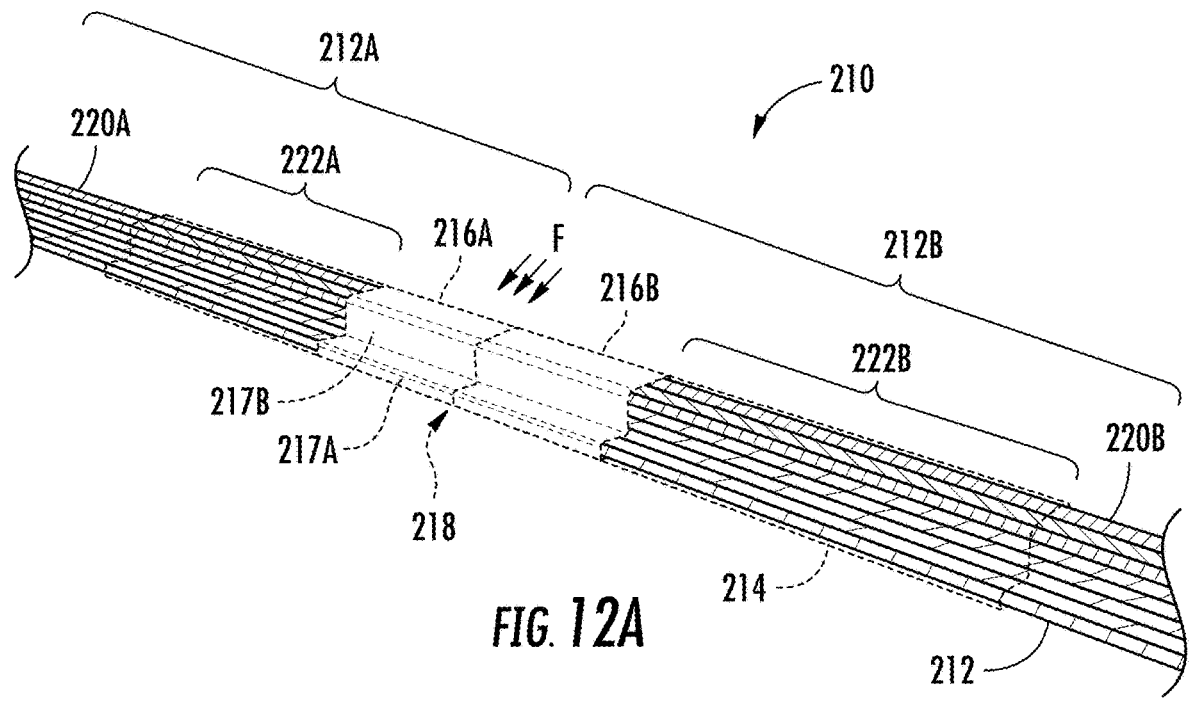
FIG. 12A is a perspective view of a portion of a fiber optic cable subassembly during fabrication, showing a two-dimensional array of multiple fusion spliced optical fibers in a process of being formed by rolling in a direction perpendicular to cores of the fusion spliced optical fibers.

FIG. 12A is a perspective view of a portion of a fiber optic cable subassembly 210 during fabrication, showing a two-dimensional array of multiple fusion spliced optical fibers in a process of being formed by rolling (by application of a rolling force F) in a direction perpendicular to cores of multiple fusion spliced optical fibers 212. The fusion spliced optical fibers 212 include first and second pluralities of fiber optic segments 212A, 212B that each include a pre-coated section 220A, 220B and a stripped section 216A, 216B, with ends of the stripped sections 216A, 216B being fusion spliced to one another at the fusion splice region 218. Overcoating material 214 extends over stripped sections 216A, 216B of the fusion spliced optical fibers 212, over the fusion splice region 218, and over portions of the pre-coated sections 220A, 220B to form overlap regions 222A, 222B. As shown, a second group of overcoated fusion spliced optical fibers 217B is taller than a first group of overcoated fusion spliced optical fibers 217A, such that with continued rolling of the second group of overcoated fusion spliced optical fibers 217B by application of the rolling force F, the second group of overcoated fusion spliced optical fibers 217B may overlap the first group of overcoated fusion spliced optical fibers 217A. If the overcoating material 214 embodies thermoplastic material, then in certain embodiments, reheating of the overcoating material 214 may cause reflow of the overcoating material 214 between the first and second groups of overcoated fusion spliced optical fibers 217A, 217B sufficient to adhere these groups together after cooling of the overcoating material 214.

Figure 12B:
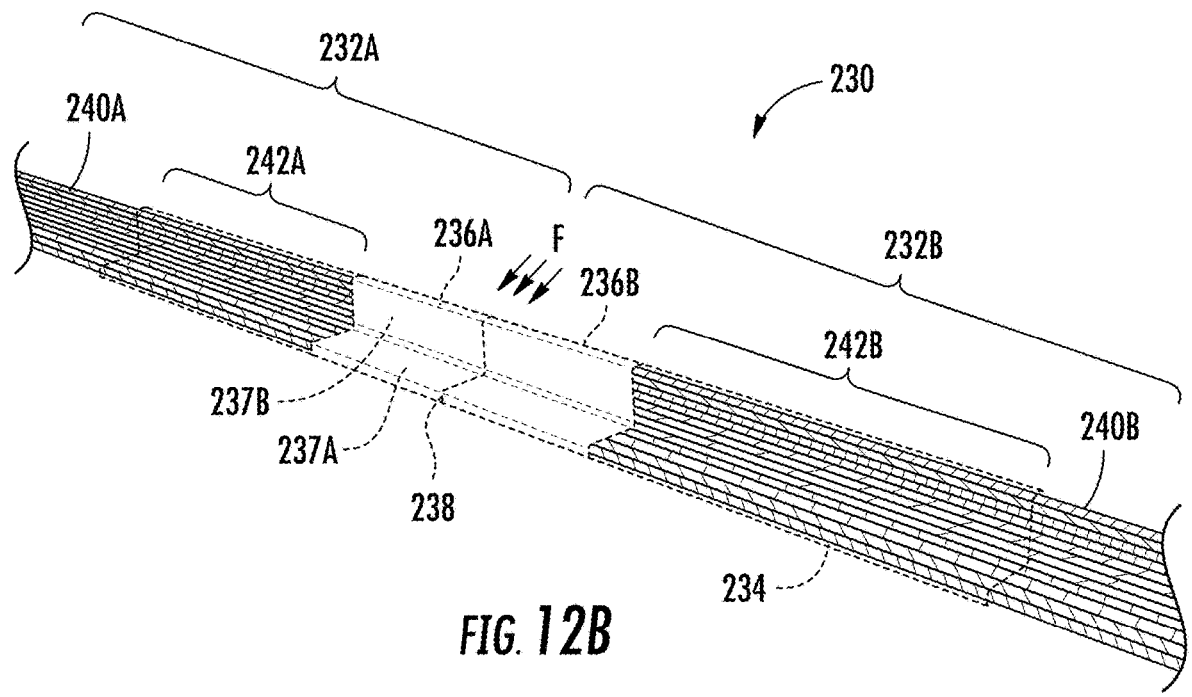
FIG. 12B is a perspective view of a portion of a fiber optic cable subassembly during fabrication, showing an overcoated first group of fusion spliced optical fibers in a state of being folded to overlap an overcoated second group of fusion spliced optical fibers.

FIG. 12B is a perspective view of a portion of a fiber optic cable subassembly 230 during fabrication, showing an overcoated second group of fusion spliced optical fibers 237B in a state of being folded, with the intention of subsequently being positioned to overlap an overcoated first group of fusion spliced optical fibers 237A. The fusion spliced optical fibers encompass first and second pluralities of fiber optic segments 242A, 242B that each include a pre-coated section 240A, 240B and a stripped section 236A, 236B, with ends of the stripped sections 236A, 236B being fusion spliced to one another at the fusion splice region 238. Overcoating material 234 extends over the stripped sections 236A, 236B, over the fusion splice region 238, and over portions of the pre-coated sections 240A, 240B to form overlap regions 242A, 242B. As shown, a second group of overcoated fusion spliced optical fibers 237B is vertically oriented and extends higher than a first group of horizontally arranged overcoated fusion spliced optical fibers 237A. With continued folding of the second group of overcoated fusion spliced optical fibers 237B by application of the folding force F, the second group of overcoated fusion spliced optical fibers 237B may be stacked atop the first group of overcoated fusion spliced optical fibers 237A. If the overcoating material 234 embodies thermoplastic material, then in certain embodiments, reheating of the overcoating material 234 may cause reflow of the overcoating material 234 between the first and second groups of overcoated fusion spliced optical fibers 237A, 237B sufficient to adhere these groups together after cooling of the overcoating material 234.

Figure 13:
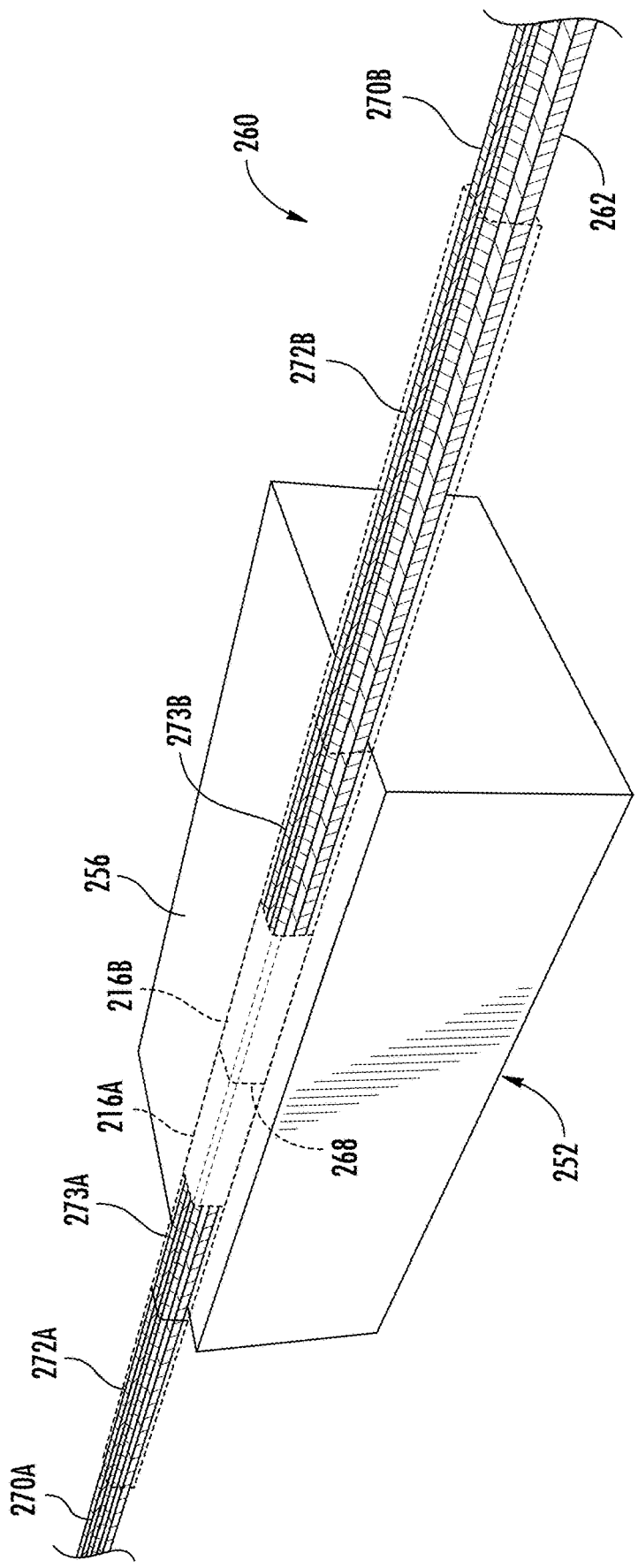
FIG. 13 is a perspective view of a portion of an overcoated fiber optic cable assembly arranged on a heated surface during fabrication, to cause reflow of polymeric overcoating material that extends over stripped sections of the fusion spliced optical fibers and the splice region.

FIG. 13 is a perspective view of a portion of an overcoated fiber optic cable 260 arranged on a heated surface 256 during a fabrication step, to cause reflow of thermoplastic overcoating material 274. A group of twelve fusion spliced optical fibers 252 are arranged in a two-dimensional array, and include first and second pluralities of fiber optic segments 252A, 252B that each include a pre-coated section 260A, 260B and a stripped section 256A, 256B. Ends of the stripped sections 256A, 256B are fusion spliced to one another at the fusion splice region 258. Thermoplastic overcoating material 254 extends over stripped sections 216A, 216B of the fusion spliced optical fibers 252, over the fusion splice region 258, and over portions of the pre-coated sections 270A, 270B to form overlap regions 272A, 272B. As shown, a central portion of the cable 260 is arranged on an upper surface 256 of a heating apparatus 252 (which may include a metal body with an internal electric cartridge heater). Contact between the overcoating material 254 and the upper surface 256 of the heating apparatus 252 will enable the overcoating material 254 to reflow when it reaches the melt flow temperature of the overcoating material 254. Such reflow may promote distribution of overcoating material 254 and adhesion between different groups of the fusion spliced optical fibers 252. Proximal overlap subregions 273A, 273A may also experience reflow due to contact with the upper surface 256 of the heating apparatus 252. Upon cooling of the overcoating material 254 applied to the fiber optic cable 260, the overcoating material 254 will harden to a solid state sufficient to protect the fusion splice region 268 and the stripped sections 256A, 256B.

EXAMPLE

Figure 14A:
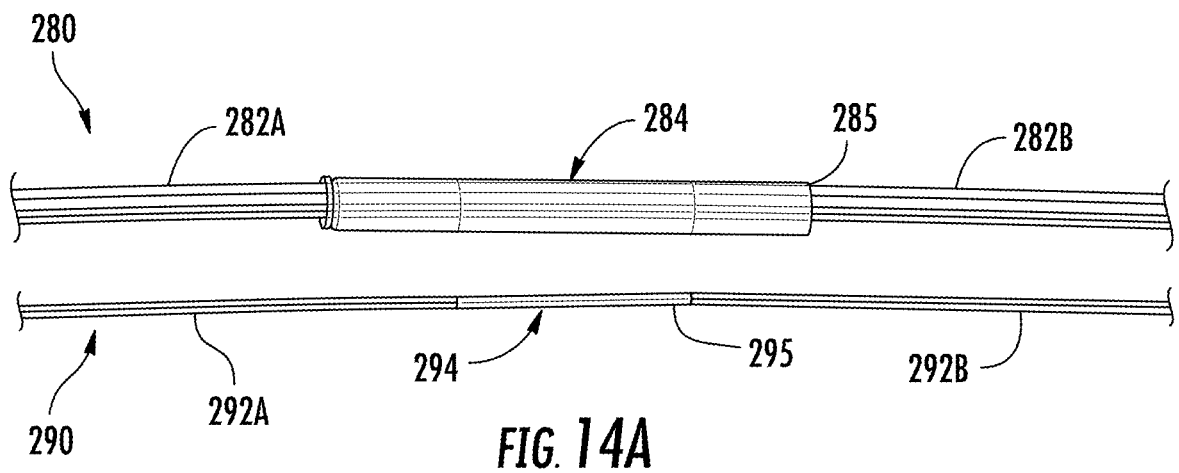
FIG. 14A provides a comparison between (top) a conventional ribbon spliced cable assembly including optical fiber ribbons spliced in a one-dimensional array format, and (bottom) a fiber optic cable assembly according to one embodiment including groups of twelve loose optical fibers fusion bonded to one another and positioned in a hexagonal close packed four-layer configuration, with a thermoplastic overcoating material protecting the splice region.

With reference to FIG. 14A, sets of twelve optical fibers 292A, 292B emanating from two loose tube cables are fusion spliced together at a fusion splice region 294. The fusion splice region 294 and stripped sections of the optical fibers 292A, 292B are overcoated (encapsulated) with polymeric material 295 and arranged in a hexagonal close packed four-layer configuration to form a fiber optic cable 290. Color patterns on both sides of the fusion splice region 294 match very well, suggesting that optical fibers 292A, 292B at the fusion splice region 294 are parallel without crossing. The fiber optic cable 290 is compared to a ribbon spliced cable 280 including first and second optical fiber ribbons 282A, 282B spliced in a one-dimensional array format at a fusion splice region 284 and protected with a conventional heat shrink splice protector 284. FIG. 14A shows that the novel fiber optic cable 290 exhibits a dramatic reduction in width/diameter and a concomitant improvement in density.

Figure 14B:
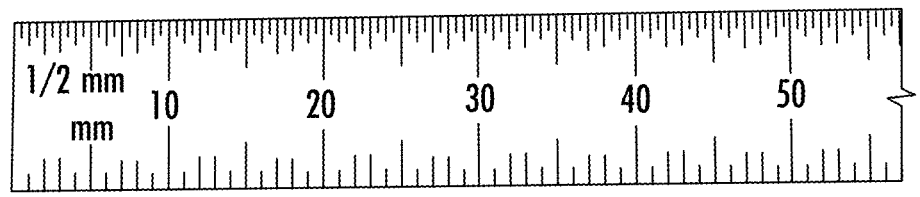
FIG. 14B illustrates the second (bottom) fiber optic cable assembly of FIG. 14A bent into a tight radius to demonstrate that the overcoated splice region exhibits greater stiffness than non-overcoated stranded fibers.
Figure 14B:
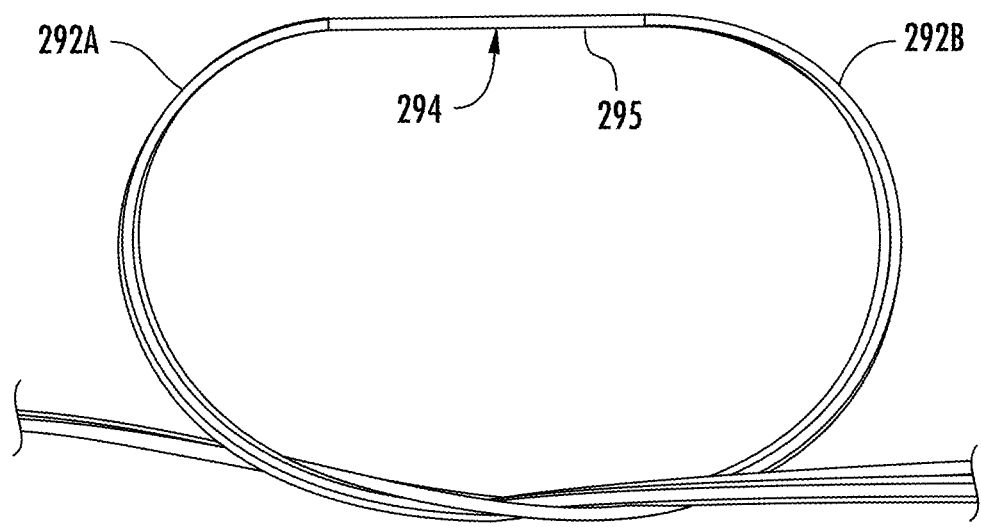

FIG. 14B illustrates the fiber optic cable 290 of FIG. 14A bent into a tight radius to demonstrate that the overcoating 295 and fusion splice region 294 exhibit greater stiffness than non-overcoated loose fibers 292A, 292B. FIG. 14B thus illustrates the stiffness resulting from the self-reinforcement effect of the packed array multi-fiber splice. Without using any external strength member, the multi-fiber fusion splice region 294 of FIG. 14B maintains straightness when the rest of the optical fibers 292A, 292B are bent to a diameter of less than 50 mm.

Those skilled in the art will appreciate that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. A fiber optic cable, comprising:
   a plurality of fusion spliced optical fibers, wherein each fusion spliced optical fiber of the plurality of fusion spliced optical fibers includes two optical fiber segments joined together by a fusion splice, and each optical fiber segment includes a stripped section proximate to the fusion splice joining the two optical fiber segments; and
   a polymeric overcoating contacting, surrounding, and extending over the fusion splices of the plurality of fusion spliced optical fibers and over the stripped section of each optical fiber segment;
   wherein the fusion splices of the plurality of fusion spliced optical fibers define a fusion splice region of the fiber optic cable, and the plurality of fusion spliced optical fibers has a non-coplanar arrangement at the fusion splice region;
   the polymeric overcoating is substantially continuous and encapsulates the stripped section of each optical fiber segment of the plurality of fusion spliced optical fibers; and the polymeric overcoating comprises a maximum width of no greater than 2 mm in a widthwise direction that is perpendicular to a lengthwise direction of the fiber optic cable.

2. The fiber optic cable of claim 1, wherein the plurality of fusion spliced optical fibers comprises at least four fusion spliced optical fibers.

3. The fiber optic cable of claim 1, wherein the polymeric overcoating comprises a length of no greater than about 30 mm in a lengthwise direction of the fiber optic cable.

4. The fiber optic cable of claim 1, wherein each optical fiber segment of the plurality of fusion spliced optical fibers includes a pre-coated section, and the polymeric overcoating further extends over a portion of the pre-coated section of each optical fiber segment.

5. The fiber optic cable of claim 1, wherein at a region distal from the fusion splice region, each group of fusion spliced optical fibers is embodied in (i) a rollable or pliable optical fiber ribbon contained within a cable jacket or an encapsulant, or (ii) a plurality of stranded optical fibers contained within a cable jacket or an encapsulant.

6. The fiber optic cable of claim 1, wherein the polymeric overcoating comprises a thermoplastic polymer.

7. The fiber optic cable of claim 6, wherein the thermoplastic polymer has a heat resistance temperature greater than 90° C., a melt flow temperature lower than 260° C., a melt viscosity between 100 cps and 10,000 cps, and a hardness of at least Shore A 45.

8. The fiber optic cable of claim 1, wherein the polymeric overcoating comprises a UV curable adhesive, a moisture curable adhesive, or a two-part adhesive.

9. The fiber optic cable of claim 1, being devoid of at least one of the following: (i) heat shrink tubing arranged over the fusion splice region, or (ii) a strength member extending over the fusion splice region.

10. A fiber optic cable, comprising:
first and second groups of fusion spliced optical fibers, wherein each fusion spliced optical fiber includes two optical fiber segments joined together by a fusion splice, each optical fiber segment includes a stripped section proximate to the fusion splice of a corresponding fusion spliced optical fiber; and
a polymeric overcoating contacting, surrounding, and extending over the fusion splices and over the stripped section of each optical fiber segment; wherein:
the fusion splices define a fusion splice region of the fiber optic cable;
the first group and the second group of fusion spliced optical fibers are arranged in respective first and second planes at the fusion splice region,
the first and second planes extend in a lengthwise direction of the fiber optic cable and are definable through fiber cores of the respective first group and second group of fusion spliced optical fibers; and
the first and second planes are non-coplanar;
each optical fiber segment includes a pre-coated section, and the polymeric overcoating further extends over a portion of the pre-coated section of each optical fiber segment, the polymeric overcoating further extends a length of at least 3 mm over the pre-coated section of each optical fiber segment.

11. The fiber optic cable of claim 10, further comprising a third group of fusion spliced optical fibers, wherein:
the third group of fusion spliced optical fibers is arranged in a third plane at the fusion splice region;
the third plane is definable through fiber cores of the third group of fusion spliced optical fibers; and
the first, second, and third planes are non-coplanar.

12. The fiber optic cable of claim 10, wherein each of the first group and the second group of fusion spliced optical fibers comprises at least three fusion spliced optical fibers.

13. The fiber optic cable of claim 10, wherein:
the polymeric overcoating is substantially continuous and encapsulates the stripped section of each optical fiber segment of the first and second groups of fusion spliced optical fibers; and
the polymeric overcoating comprises a maximum width of no greater than 2 mm in a widthwise direction that is perpendicular to a lengthwise direction.

14. The fiber optic cable of claim 10, wherein the polymeric overcoating comprises a length of no greater than about 30 mm in a lengthwise direction of the fiber optic cable.

15. The fiber optic cable of claim 10, wherein:
the stripped section of each optical fiber segment has a length in a range of from 3 mm to 12 mm.

16. The fiber optic cable of claim 10, wherein at a region distal from the fusion splice region, each group of fusion spliced optical fibers is embodied in a rollable or pliable optical fiber ribbon contained within a cable jacket or an encapsulant.

17. The fiber optic cable of claim 10, wherein at a region distal from the fusion splice region, each group of fusion spliced optical fibers is embodied in a plurality of stranded optical fibers contained within a cable jacket.

18. The fiber optic cable of claim 10, wherein the polymeric overcoating comprises a thermoplastic polymer.

19. The fiber optic cable of claim 18, wherein the thermoplastic polymer has a heat resistance temperature greater than 90° C., a melt flow temperature lower than 260° C., a melt viscosity between 100 cps and 10,000 cps, and a hardness of at least Shore A 45.

20. The fiber optic cable of claim 11, wherein the polymeric overcoating comprises a UV curable adhesive, a moisture curable adhesive, or a two part adhesive.

21. The fiber optic cable of claim 11, being devoid of heat shrink tubing arranged over the fusion splice region.

22. The fiber optic cable of claim 11, being devoid of a strength member extending over the fusion splice region.

23. The fiber optic cable of claim 1, wherein the plurality of fusion spliced optical fibers are in contact with each other.

\* \* \* \* \*

UNITED STATES PATENT AND TRADEMARK OFFICE
CERTIFICATE OF CORRECTION

Page 1 of 1

PATENT NO. : 10,976,492 B2
APPLICATION NO. : 16/551883
DATED : April 13, 2021
INVENTOR(S) : Qi Wu It is certified that error appears in the above-identified patent and that said Letters Patent is hereby corrected as shown below:

On the Title Page

Page 2, Column 2, item [56], Line 19, delete "Woo," and insert -- Wood, --, therefor.

Page 2, Column 2, item [56], Line 29, delete "Usion" and insert -- Fusion --, therefor.

In the Claims

Column 26, Line 49, Claim 20, delete "two part" and insert -- two-part --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*